US005691683A

United States Patent [19]
Allwine, Jr.

[11] Patent Number: 5,691,683
[45] Date of Patent: *Nov. 25, 1997

[54] MULTI-POLE COMPOSITE MAGNET

[76] Inventor: Elmer C. Allwine, Jr., 450 Harvard Ave. #9C, Santa Clara, Calif. 95051

[*] Notice: The term of this patent shall not extend beyond the expiration date of Pat. No. 5,218,251.

[21] Appl. No.: 424,140

[22] Filed: Apr. 17, 1995

Related U.S. Application Data

[60] Division of Ser. No. 958,987, Oct. 9, 1992, Pat. No. 5,440,185, which is a continuation-in-part of Ser. No. 784,207, Oct. 28, 1991, Pat. No. 5,258,735.

[51] Int. Cl.⁶ ............................................. H01F 7/02
[52] U.S. Cl. ............................................. 335/306; 335/302
[58] Field of Search ........................... 310/49 R, 90.5, 310/156; 335/302, 306; 324/207.25

[56] References Cited

U.S. PATENT DOCUMENTS

| | | | |
|---|---|---|---|
| 3,969,644 | 7/1976 | Nowak | 310/152 |
| 4,207,483 | 6/1980 | Baer | 310/49 |
| 4,471,331 | 9/1984 | Wyatt | 335/285 |
| 4,583,752 | 4/1986 | Breitbach | 280/6 R |
| 5,218,251 | 6/1993 | Allwine, Jr. | 310/49 R |
| 5,258,735 | 11/1993 | Allwine, Jr. | 335/30 G |

FOREIGN PATENT DOCUMENTS

| | | | |
|---|---|---|---|
| 27 27 003 | 1/1979 | Germany | H02K 1/24 |
| 2 030 789 | 4/1980 | United Kingdom . | |
| WO 93/09550 | 5/1993 | WIPO | H01F 7/02 |

Primary Examiner—Michael L. Gellner
Assistant Examiner—Raymond Barrera
Attorney, Agent, or Firm—Skjerven,Morrill,MacPherson,Franklin & Friel; Alan H. MacPherson

[57] ABSTRACT

The composite magnet comprises two sections, each section having a plurality of projections and apertures. The projections and apertures on a first section mate with the apertures and projections, respectively, on the second section. The first and second sections are magnetized in opposite axial directions.

1 Claim, 20 Drawing Sheets

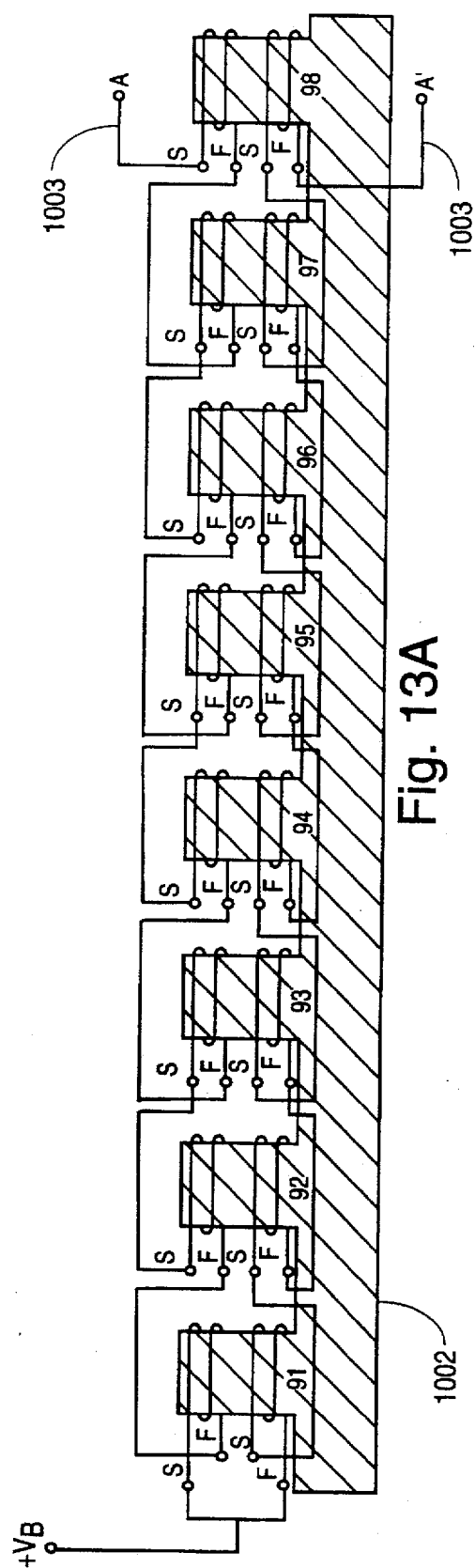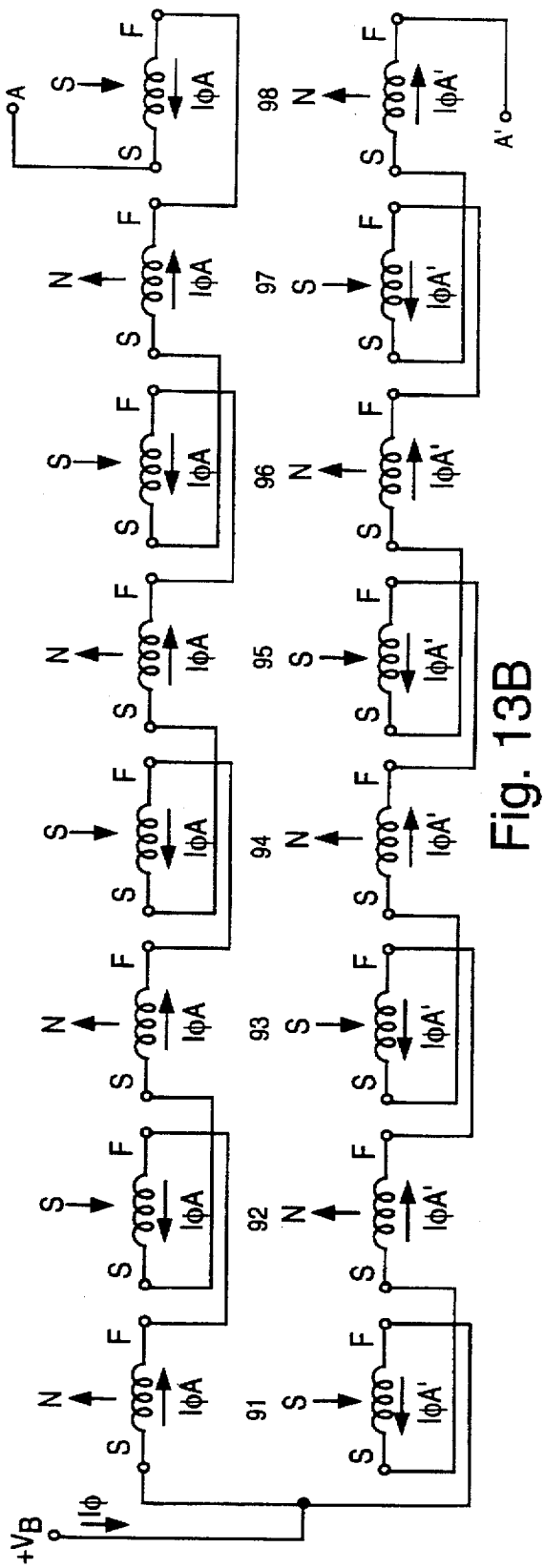

5,691,683

MULTI-POLE COMPOSITE MAGNET

CROSS REFERENCE TO RELATED APPLICATIONS

This application is a division of application Ser. No. 07/958,987, filed Oct. 9, 1992, now U.S. Pat. No. 5,440,185, which is a continuation-in-part of the parent application Ser. No. 07/784,207, entitled "Multi-Pole Composite Magnet", filed by Elmer C. Allwine, Jr. on Oct. 28, 1991, now U.S. Pat. No. 5,258,735.

BACKGROUND OF THE INVENTION

1. Field of the Invention

This invention relates to brushless DC motors, and in particular to a brushless DC motor which uses a composite magnet.

2. Description of the Related Art

U.S. Pat. No. 4,851,731, issued to Saotome et al., discloses a flat type DC motor in which vibrations of the rotor axle are prevented by providing an asymmetrical magnetic field between the stator yoke and the rotor. The disc-shaped rotor magnet comprises a solid piece on which magnetic north and south poles are alternatingly arranged. However, because opposite magnetic poles are formed in the same material (described in a later section regarding the "Block" wall effect), Saotome et al. provide less than optimal definition of poles. Moreover, magnetizing a solid material typically entails winding a wire around the solid material in a predetermined manner and then applying a voltage thereto. This method of magnetizing frequently fails to provide total saturation of the material, thereby failing to provide optimal field strength.

U.S. Pat. No. 4,187,441, issued to Oney on Feb. 5, 1990, discloses a permanent magnet rotor disk comprising a plurality of permanent magnet sections secured by spokes. As noted explicitly in Oney, the spokes are constructed of non-magnetic material such as aluminum or an aluminum alloy. Thus, although Oney has the capability to provide total saturation of the permanent magnet sections, Oney actually introduces a large pole transition area with the non-magnetic spokes. Moreover, securing individual permanent magnet sections between the spokes yields a highly labor-intensive process, thereby significantly increasing manufacturing cost.

Therefore, a need arises for a brushless DC motor having both a high power output density as well as a high power output per unit cost.

SUMMARY OF THE INVENTION

In accordance with the present invention, a brushless DC motor is compact, easily manufactured, and provides high power density. The brushless DC motor comprises a multi-pole, composite magnet which functions as a portion of a rotor, at least one stator member which determines the angular position of this composite magnet, and means for positioning the composite magnet and the stator member on a common axis.

The composite magnet comprises two sections, each section having a plurality of protrusions and apertures. The protrusions and apertures on a first section mate with the apertures and protrusions, respectively, on the second section. The first and second sections are magnetized in opposite axial direction which results in two advantages. First, the composite magnetic provides an increased area of energy conversion per unit volume in comparison to prior art brushless DC motors, thereby significantly reducing the size of a given motor. Second, because the protrusions and apertures are magnetized in opposite axial directions, the magnetic poles are extremely well defined, thereby ensuring that accuracy and high torque capability are provided.

In another embodiment of the present invention, the composite magnet comprises two sections, each section having a hub and a plurality of spokes formed integrally with this hub. The two sections are magnetized in opposite axial directions and then mated together. A non-magnetized rim is then formed on the outside perimeter of the composite magnet.

Each stator member has a plurality of pole pieces which are positioned in an operative relation to the composite magnet. In one embodiment, two windings are formed on each stator member. Providing current to one or the other of these windings determines the polarity of the pole pieces on that stator member.

In another embodiment of the present invention, each stator member includes two magnetic plates which sandwich a non-magnetic plate. The non-magnetic plate provides minor protrusions on the inner and outer diameter of the stator member. The minor protrusions secure the coil windings which are wound radially on the assembled stator member.

Sensing devices are mounted in operative relation to the composite magnet and the stator member to provide feedback signals to a means for determining the current flow through the windings on the stator member.

BRIEF DESCRIPTION OF THE DRAWINGS

FIG. 13A shows a diagram of a linear view of the windings on an illustrative stator member.

FIG. 13B illustrates that each pair of coils provides opposite current flow, thereby inducing opposite polarities in the pole pieces.

DETAILED DESCRIPTION OF THE DRAWINGS

In accordance with the present invention, a rotor for a brushless DC motor comprises two pieces of permanent magnetic material formed with protrusions and/or apertures which facilitate joining of the two pieces. The two pieces are magnetized in opposite axial directions. In this manner, the two pieces, when joined together, form a composite magnet, thereby significantly reducing manufacturing expense and, additionally, providing the advantage of well-defined north and south poles.

Figure 1A:
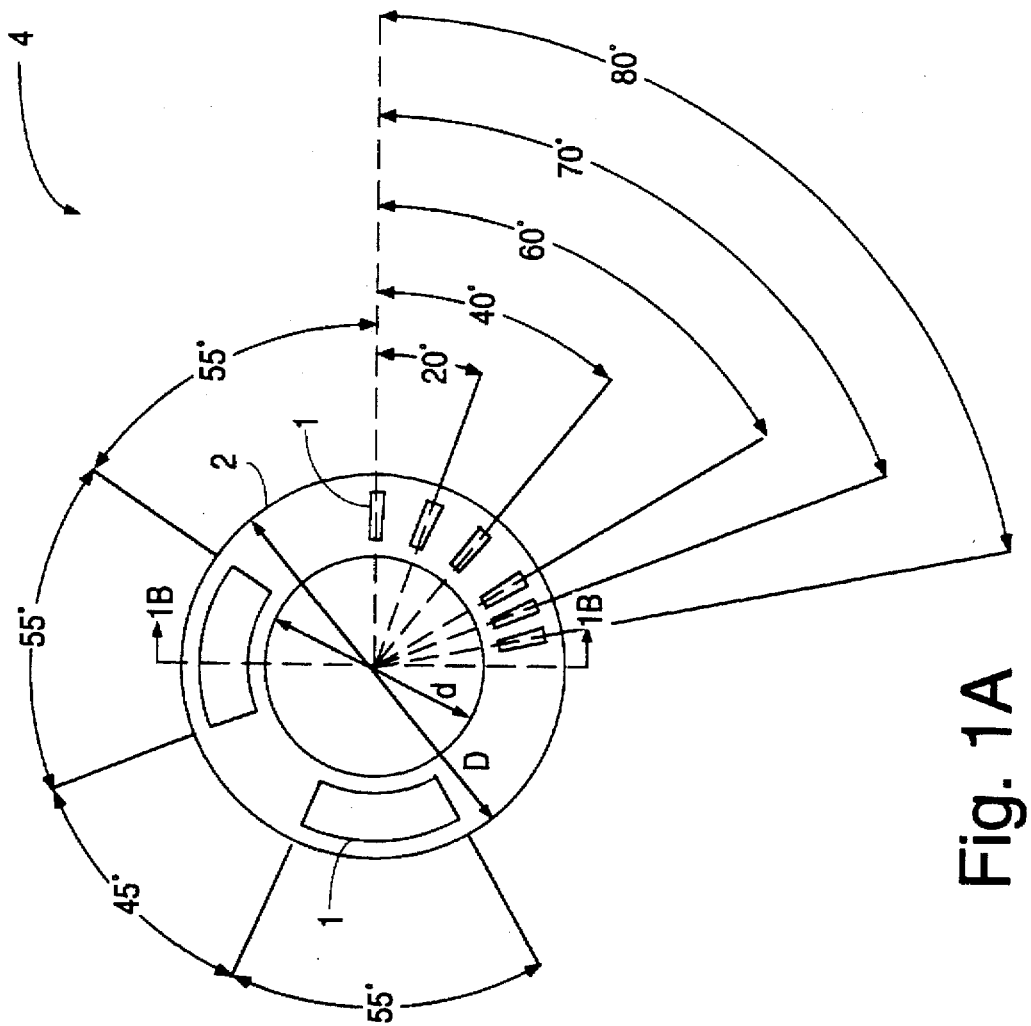
FIGS. 1A and 1B illustrate a top view and a cross-sectional view, respectively, of one half of a composite magnet having protrusions on its surface.
Figure 1B:
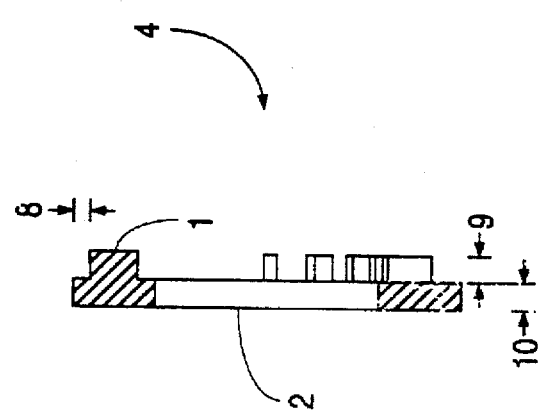
Figure 2A:
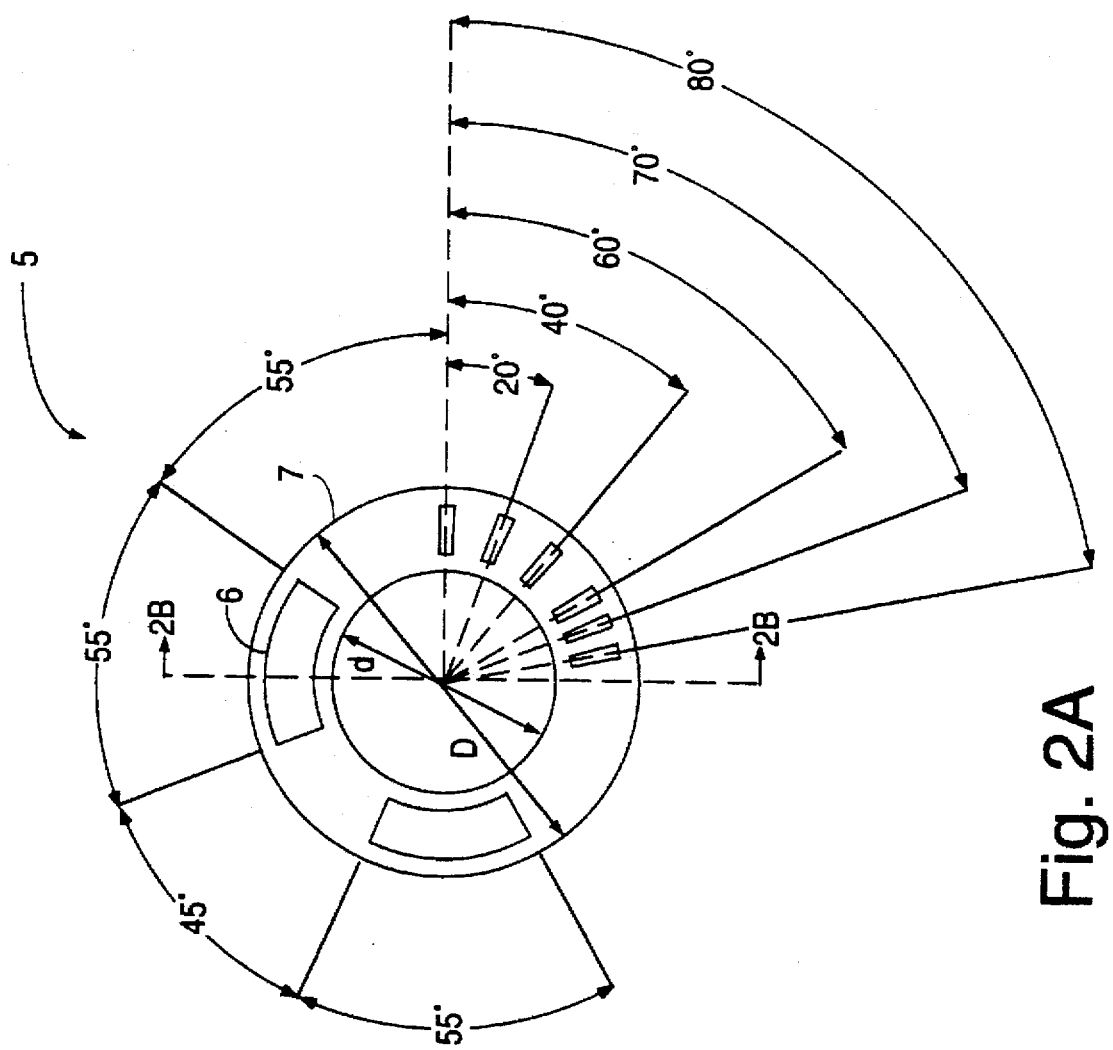
FIGS. 2A and 2B show a top view and a cross-sectional view, respectively, of the complementary half of the composite magnet shown in FIGS. 1A and 1B which has apertures extending completely through the complementary half.
Figure 2B:
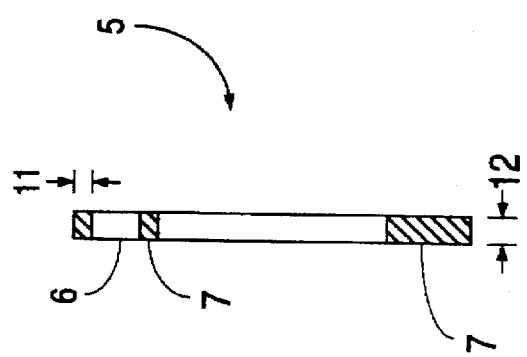

FIGS. 1A, 1B, and 2A, 2B illustrate one embodiment of a composite magnet in which each piece of the composite magnet either has protrusions or apertures. FIG. 1A illustrates a planar view of a magnet 4 which has protrusions 1 formed integrally with a structural member 2. FIG. 1B shows a cross-section of magnet 4 shown in FIG. 1A. FIG. 2A illustrates magnet 5, the complementary piece to magnet 4 shown in FIG. 1A. Magnet 5, in contrast to magnet 4, has apertures 6 which extend through a structural member 7. FIG. 2B shows a cross-section of magnet 5. The dimensions for magnets 4 and 5, indicated by reference numerals in FIGS. 1A, 1B, 2A and 2B, are as follows, 8: 0.07 inches (0.179 cm), 9: 0.08 inches (0.203 cm), 10: 0.08 inches (0.203 cm), 11: 0.07 inches (0.179 cm), and 12: 0.08 inches (0.203 cm).

Each protrusions 1 found on magnet 4 shown in FIGS. 1A and 1B matches an aperture 6 formed on magnet 5 shown in FIGS. 2A and 2B. Hence, to join magnet 4 with magnet 5, each protrusion 1 mates with its corresponding aperture 6. Because each half of the composite magnet, magnet 4 or magnet 5, is magnetized in an opposite axial direction to the other half (as will be described later in reference to FIG. 4), complete saturation is possible, i.e. a particular pole is homogeneously established at a particular strength throughout the whole member.

Figure 3A:
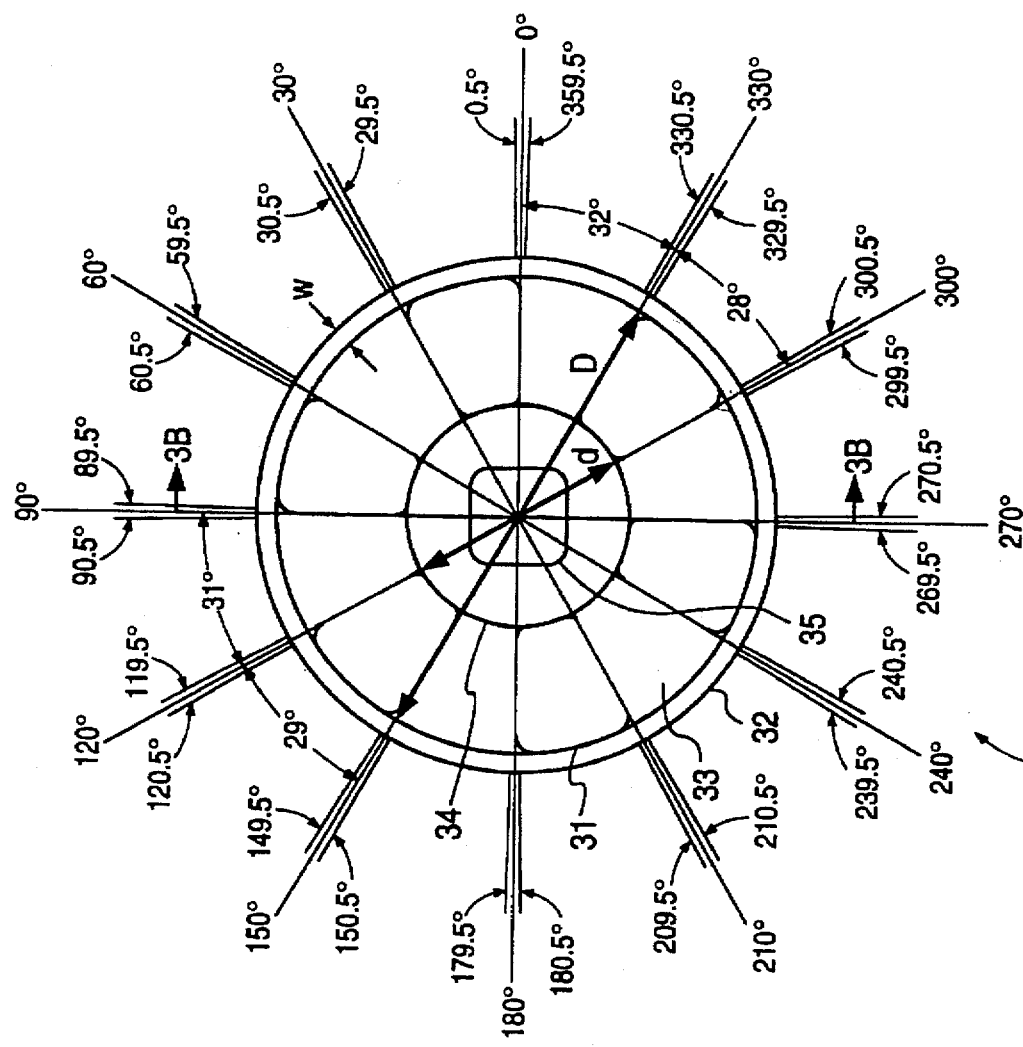
FIGS. 3A and 3B illustrate a top view and a cross-sectional view, respectively, of an embodiment of one-half a composite magnet in accordance with the present invention having both protrusions and apertures.
Figure 3B:
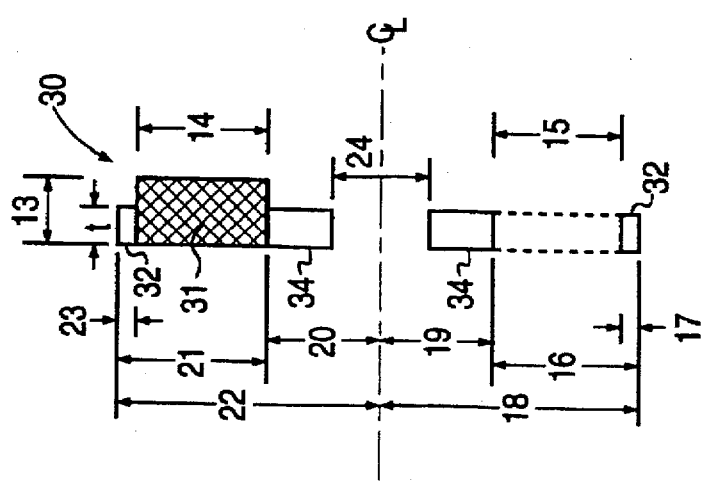

FIGS. 3A and 3B illustrate one embodiment of one-half of a composite magnet for a brushless DC motor, wherein each half of the composite magnet has protrusions and apertures. In FIG. 3A, magnet 30 has protrusions 31, structural members 32 and 34 (outer and inner, respectively), apertures 33, and shaft hole 35. FIG. 3B shows magnet 30 in cross-section.

Figure 3C:
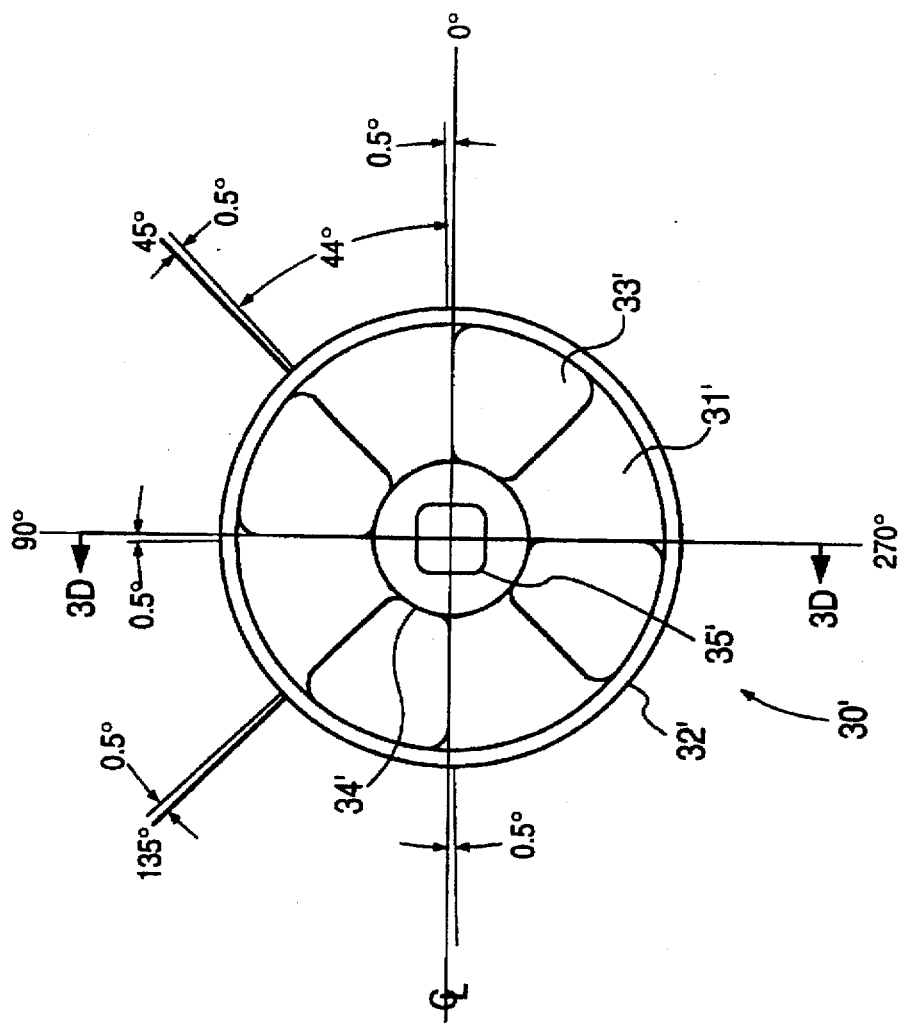
FIGS. 3C and 3D illustrate a top view and a cross-sectional view, respectively, of another embodiment of one-half of a composite magnet having both protrusions and apertures.
Figure 3D:
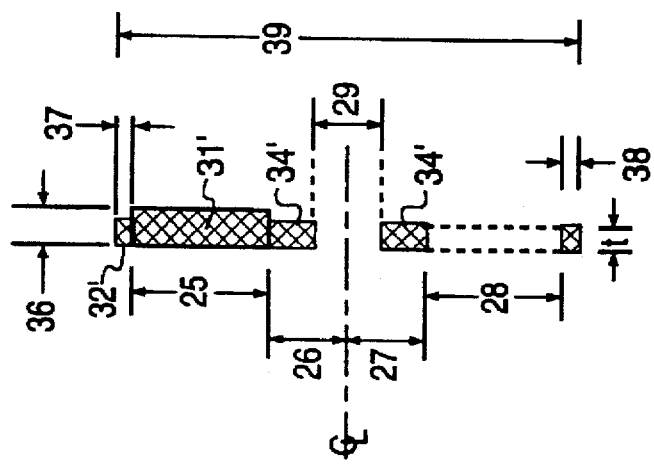

In this embodiment, magnet 30 has an inner diameter d of 0.585 inches (1.486 cm) and an outer diameter D of 1.40 inches (3.556 cm). The width w of outer member 32 is 0.05 inches (0.127 cm), whereas the thickness t of this member is 0.10 inches (0.254 cm). The thickness of each protrusion 31 is 0.10 inches (0.254 cm). Thus, each aperture 33 is also 0.10 inches (0.254 cm) deep. The angular distance from an edge of protrusions 31 to an adjacent protrusion edge is approximately 30°. For ease of assembly, protrusions 31 are typically one degree (1°) smaller in angular distance than apertures 33 as shown in FIG. 3A. Note that this embodiment of a composite magnet has 12 poles. Other dimensions for magnet 30, indicated by reference numerals in FIG. 3B, are as follows, 13: 0.2 inches (0.508 cm), 14: 0.35 inches (0.889 cm), 15: 0.36 inches (0.914 cm), 16: 0.41 inches (1.041 cm), 17: 0.05 inches (0.127 cm), 18: 0.7 inches (1.778 cm), 19: 0.29 inches (0.737 cm), 20: 0.295 inches (0.749 cm), 21: 0.405 inches (1.029 cm), 22: 0.7 inches (1.778 cm), 23: 0.055 inches (0.140 cm), and 24: 0.25 inches (0.635 cm). Another embodiment of a composite magnet 30' in accordance with the present invention includes 8-poles as shown in FIG. 3C (top view) and FIG. 3D (cross-sectional view). The elements designated by prime reference numerals in FIG. 3C refer to the corresponding elements designated by standard reference numerals in FIG. 3A. The dimensions of magnet 30' are as follows, 25: 0.690 inches (1.753 cm), 26: 0.405 inches (1.029 cm), 27: 0.4 inches (1.016 cm), 28: 0.7 inches (1.778 cm), 29: 0.375 inches (0.952 cm), 36: 0.2 inches (0.508 cm), 37: 0.105 inches (0.267 cm), 38: 0.1 inches (0.254 cm), and 39: 2.4 inches (6.096 cm).

Referring back to FIGS. 3A and 3B, magnet 30 mates with an identical magnet which is magnetized in the opposite axial direction to form the composite magnet. As mentioned previously, because protrusions 31 have a height equal to the depth of apertures 33, the resulting composite magnet has a flush outer surface having a thickness of about 0.2 inches (0.508 cm).

Figure 3E:
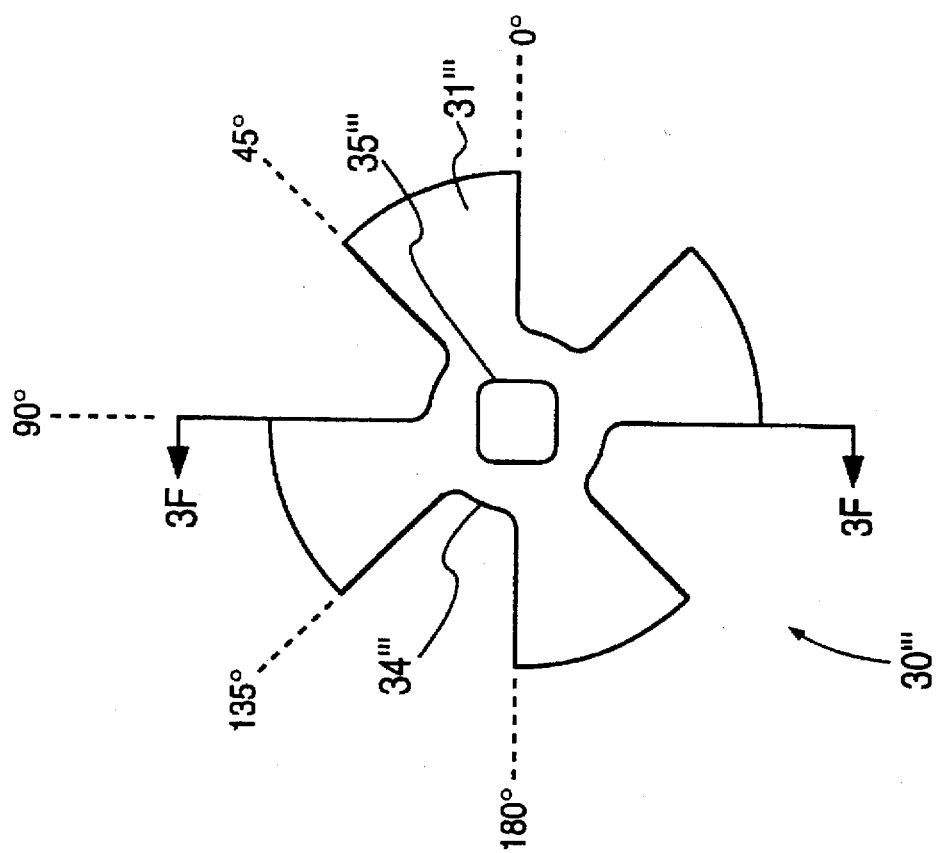
FIGS. 3E and 3F illustrate a top view and a cross-sectional view, respectively, of another embodiment of one-half of a composite magnet having a hub and radial members.
Figure 3F:
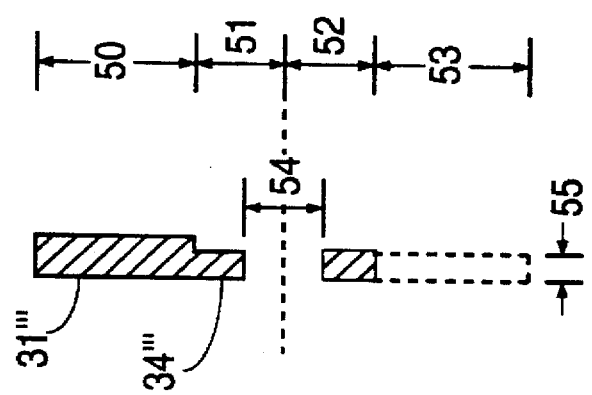

In yet another embodiment of the present invention shown in FIGS. 3E and 3F, each half 30''' of a composite magnet has a hub 34''' with radial members 31''' emanating from hub 34'''. The dimensions of half 30''' are as follows, 50: 0.69 inches (1.753 cm), 51: 0.405 inches (1.029 cm), 52: 0.405 inches (1.029 cm), 53: 0.69 inches (1.753 cm), 54: 0.375 inches (0.953 cm), and 55: 0.1 inches (0.254 cm). After two halves 30''' are magnetized in opposite axial directions and joined together, a non-magnetic rim (not shown) of, for example stainless steel or aluminum, secures halves 30'''. This use of halves 30''' is particularly advantageous for dynamic applications in which the size of the rotor and/or the angular velocity of the rotor necessitate a composite magnet that withstands higher stress. This embodiment of the composite magnet allows significantly higher angular velocity and acceleration of the rotor. Moreover, because the non-magnetic rim is thinner than structural member 32 (FIG. 3A), the present embodiment increases the size of the poles per unit size of the composite magnet. Additionally, this embodiment increases the outer working radius of the composite magnet.

In some prior art rotors, such as the rotor taught by Saotome et al., a lack of well-defined north and south poles occurs because of the "Block wall" effect. A "Block wall" effect typically occurs if a north and south pole are provided on the same piece of material. When a "Block wall" occurs, the transition from one polarity to another is accompanied by a decrease in the magnetic field and a gradual switching from north to south and from south to north poles. In other words, a finite distance through the material is required to complete the transition from one pole to another. Generally, the distance associated with the polarity switch is too large to constitute well-defined poles. Moreover, because magnets are typically formed from ferrite particles which are of varying sizes, in addition to impurities present in manufacturing, the transition distance may actually vary, thereby further worsening pole definition. Ill-defined poles in a rotor cause highly undesirable angular positioning inaccuracies.

In contrast, a composite magnet in accordance with the present invention has poles which are formed in different pieces of material. In this manner, irrespective of the homogeneity of the material comprising the magnet or impurities present in manufacturing, the transition distance between poles is geometrically fixed. Specifically, when two magnets 30 are joined to each other, the transition region from north to south poles, and vice versa (described above as the "Block wall" effect) is virtually eliminated, thereby providing extremely well-defined poles.

Protrusions 31 have the same depth as apertures 33. Hence, when two magnets 30 are joined, the outer surface of the composite magnet is flush. In this manner, the present invention solves the problem of mechanical alignment experienced in the prior art, thereby expanding possible applications for the composite magnet.

Figure 4:
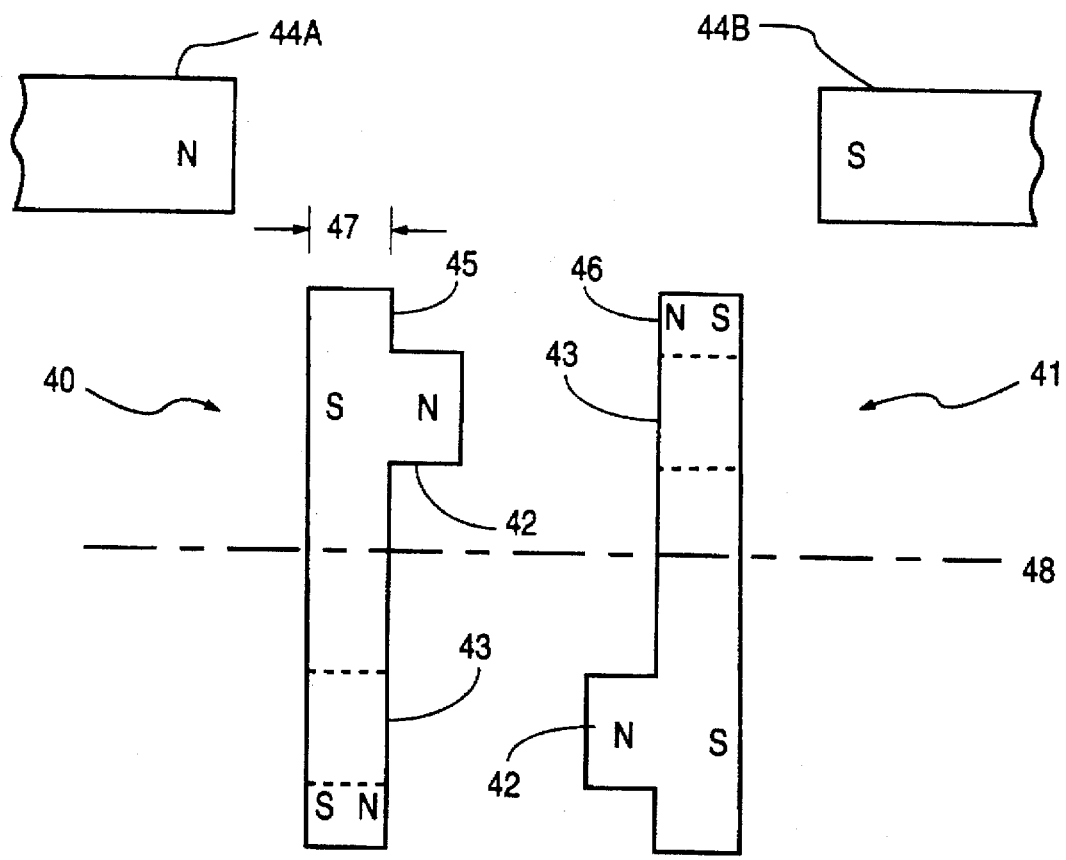
FIG. 4 shows one example of a magnetizing process for composite magnet pieces in accordance with the present invention.

One method of magnetizing the two halves of a composite magnet is shown in FIG. 4. North and south poles are established on magnets 40 and 41 using conventional methods, such as magnetizing by two pole pieces 44A and 44B (north and south, respectively). This method is extremely simple and cost effective. Note that magnets 40 and 41 may be physically magnetized at the same time by positioning either magnet 40 or 41 on its opposite side, thereby lining up the poles in one direction. Because magnets 40 and 41 are magnetized in opposite axial directions, i.e. for purposes of joining the two magnets, as magnet 40 nears magnet 41 there is an initial repulsion due to the fact that the respective north poles of each magnet are nearing each other.

However, once a protrusions 42 is introduced into an aperture 43, the attraction between the north and the south poles of the other magnet draws magnets 40 and 41 together. Because of the configuration of mating pieces, a slight repulsion exists between surface 45 of magnet 40 and surface 46 of magnet 41. Although the attractive forces mentioned above are much greater than these repulsive forces, a fast-setting bonding agent may be used on the mating surfaces of magnets 40 and 41 to ensure no gaps are formed after joining of the two magnets.

The strong bond between magnets 40 and 41 forms the composite magnet. In this manner, the composite magnet acts as a single permanent magnet exhibiting a magnetic pattern of north-south poles matching the pattern of protrusions and apertures. Note that the above-described method of magnetizing results in axial north-south poles, i.e. the poles are positioned about axis 48, not radially spreading from a common center.

The size of the protrusions and apertures of the composite magnet varies, depending on the particular application for which the composite magnet is used. Manufacturing of the complementary halves of the composite magnet is accomplished using conventional machining or injection molding processes (which significantly reduces manufacturing cost). Preferred materials for making the composite magnet include, but are not limited to: barium ferrite in plastic form, for example 3M Brand Magnet Material B1060-B1062; for higher energy product, neodymium boron in plastic form, sold by Tengam under the trade-name "NeoComp"; rare-earth materials, such as samarium cobalt, if expense warrants their usage; or any moldable ceramic grades of material.

Because the composite magnet is typically formed from a mold which is very accurately machined, the angular positioning of the north and south poles is virtually perfect. Also, the region between any north and south pole, is very narrow (approximately ½ degree), and located along a very accurate radial line. This narrow region ensures the composite magnet will exhibit an extremely rapid transition between any north to south pole or any south to north pole. This high rate of change in magnetic polarity (generally described in the art as $d\phi/d\theta$) being very accurately located with respect to any angular line results in a very small angular positioning error.

In many conventional brushless DC motors, the magnetic field is established around the outer circumference of a long cylinder. In contrast, the magnetic field of the composite magnet (described in detail later) emanates from both sides of a relatively thin disc, thereby dramatically altering the geometry of the energy conversion space. Specifically, while a conventional brushless DC motor has a radial magnetic field applying force to radially-oriented electromagnetic poles, the present invention has an axial magnetic field applying force to axially-oriented electromagnetic poles. Thus, the composite magnet can significantly increase the area of energy conversion per unit volume in comparison to prior art brushless DC motors. For example, it is well known that the surface area of a cylinder for a typical prior art rotor is equal to $2\pi r h_1$ and the surface area of two circular surfaces of the composite magnet in accordance with the present invention is $2\pi r^2$ (where r is the radius of both the cylinder and the composite magnet and $h_1$ is the height of the cylinder). It logically follows that for the surface areas, i.e. the areas available for the purpose of energy conversion, of the cylinder and the composite magnet to be equal, the height $h_1$ of the cylinder must equal the radius r of the composite magnet. Note the volume of the cylinder is represented by $\pi r^2 h_1$, whereas the volume of the composite magnet is represented by $\pi r^2 h_2$ (where $h_2$ is the thickness of the composite magnet). Thus, the following ratio is derived:

$$\frac{\text{Volume of composite magnet}}{\text{Volume of cylinder}} = \frac{\pi r^2 h_2}{\pi r^2 h_1} = \frac{h_2}{h_1}$$

In typical applications, the height $h_2$ of the composite magnet is 0.2 inches (0.508 cm), whereas the height $h_1$ of the cylinder is 1 inch (2.540 cm). Using the illustrative measurements above, a ratio of 1 to 5 is derived. This means that for equal surface areas available for energy conversion the composite magnet is at least five times smaller in volume.

Thus, for equal surface areas, i.e. effective energy conversion areas, a rotor comprising a composite magnet, in comparison to a conventional rotor comprising a cylinder, provides a more effective use of volume in a brushless DC motor. Therefore, to provide a given torque, the volume of a brushless DC motor in accordance with the present invention can be considerably reduced when compared to the prior art. Indeed, the present invention results in a more densely concentrated energy conversion volume where the permanent magnet flux density interacts with the electromagnetic poles. Hence, in comparison to conventional rotors, the present invention provides a higher torque output per unit volume.

Moreover, it is also well known in the art that the moment of inertia of a cylinder is equal to $\frac{1}{2}mr^2$, where m is the mass which is equal to the density of the material times the volume. Therefore, assuming similar materials are used for both the cylindrical rotor and for the composite magnet, the composite magnet provides a lower moment of inertia than the prior art rotor, and thus a higher torque to moment of inertia ratio results.

Figure 5:
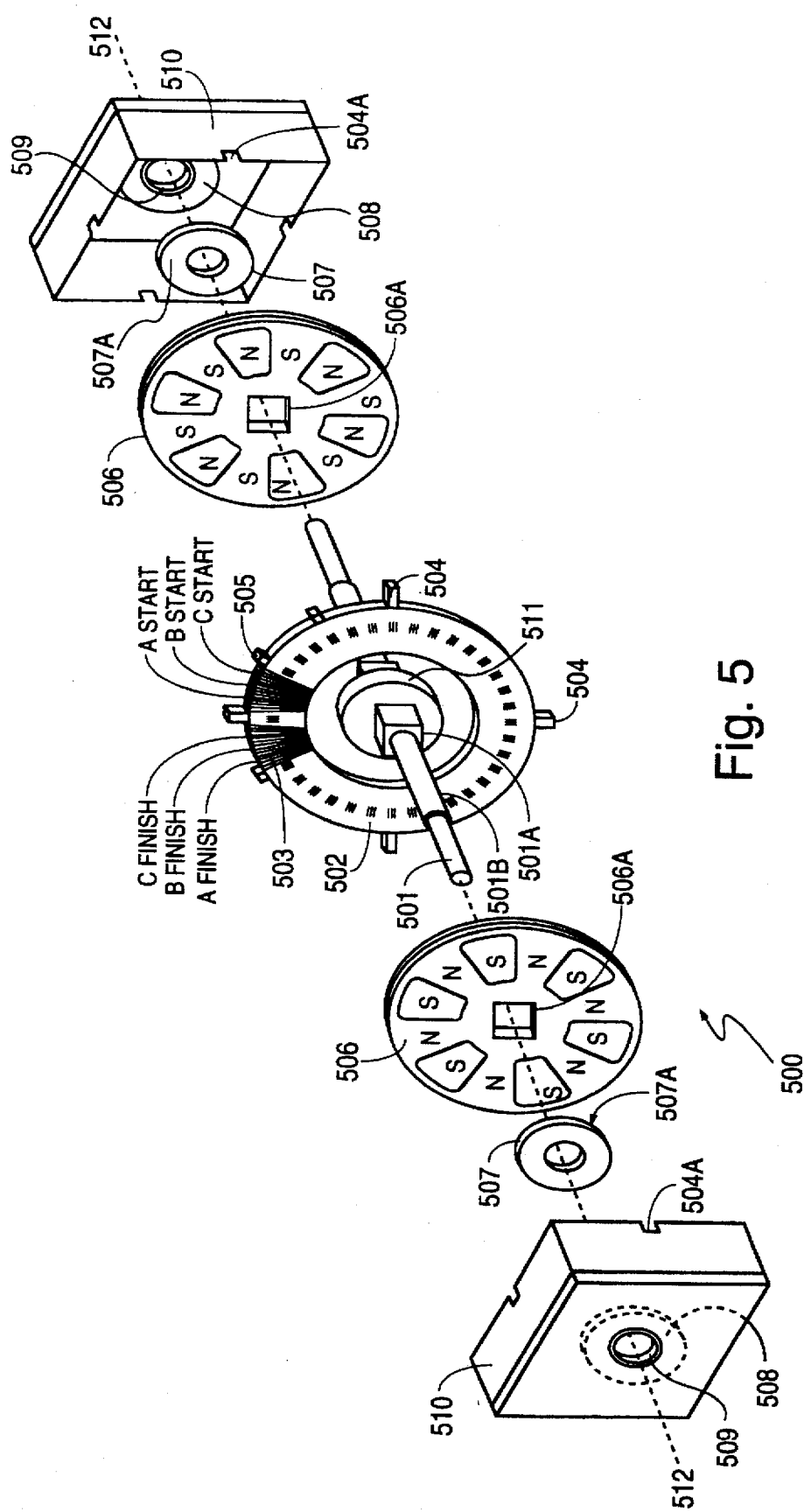
FIG. 5 illustrates an exploded perspective view of one embodiment of a composite magnet brushless DC motor in accordance with the present invention.

FIG. 5 illustrates one embodiment of a brushless DC motor 500 in accordance with the present invention. Referring to FIG. 5, the motor shaft 501 is supported and centered by bearings 509 (see also FIG. 6) which are seated in the motor housing 510. The center spacer 511, formed from a nonmagnetic material such as aluminum or plastic, is press fitted to or integrally formed with shaft 501 by a machining or molding operation, thereby establishing an accurate axis 512 for mounting the composite magnets 506. The thickness of center spacer 511 determines the working air gap between composite magnets 506 and stator member 502.

Figure 8A:
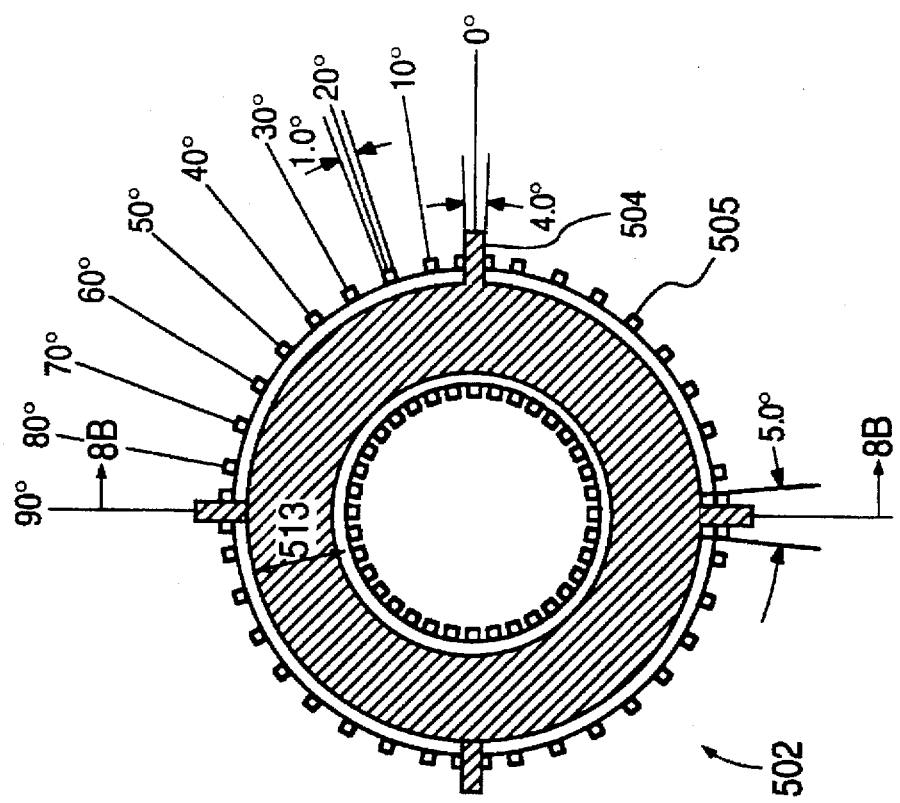
FIGS. 8A and 8B show a top and cross-sectional view, respectively, of a stator member in accordance with the present invention.
Figure 8B:
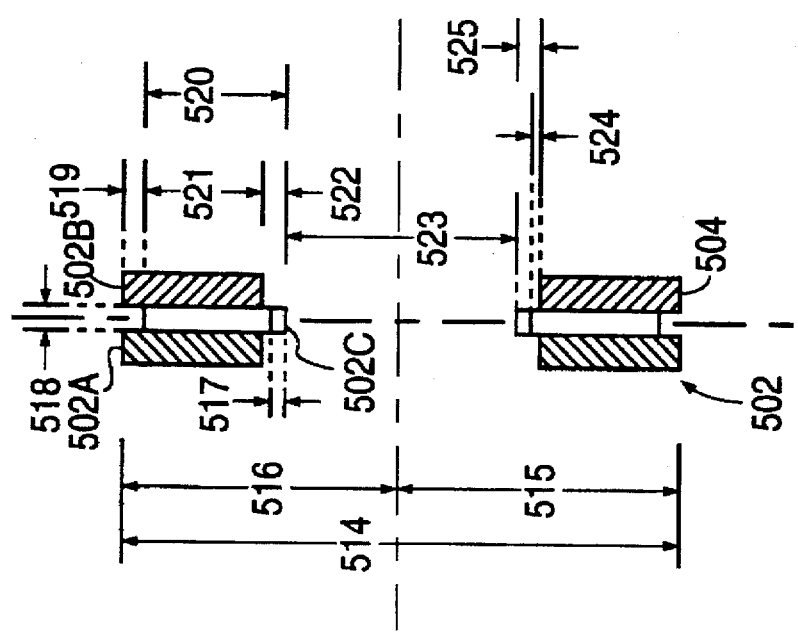

Stator member 502 completes the magnetic circuit on the inner working faces of composite magnets 506. FIGS. 8A and 8B illustrate one embodiment of stator member 502. Referring to FIGS. 5, 8A, and 8B, stator member 502 comprises two outer plates 502A and 502B, fabricated from a low carbon (i.e high permeability) steel, which provides the four main protrusions 504 for mounting stator member 502 to housing 510 (FIG. 5). Outer plates 502A and 502B secure inner plate 502C which is fabricated from a nonconductive material such as plastic and provides minor protrusions 505 on the inner and outer diameter of stator member 502. The number of protrusions 505 is equal to the total number of magnetic poles multiplied by the number of phases. The dimensions of stator member 502, as indicated in FIGS. 8A and 8B, are as follows, 513: 0.3 inches 0.762 cm), 514: 1.5 inches (3.81 cm), 515: 0.75 inches (1.905 cm), 516: 0.75 inches (1.905 cm), 517: 0.025 inches (0.063 cm), 518: 0.03 inches (0.076 cm), 519: 0.50 inches (1.27 cm), 520: 0.4 inches (1.016 cm), 521: 0.35 inches (0.889 cm), 522: 0.05 inches (0.127 cm), 523: 0.6 inches (1.524 cm), 524: 0.025 inches (0.063 cm), and 525: 0.05 inches (0.127 cm).

Figure 9:
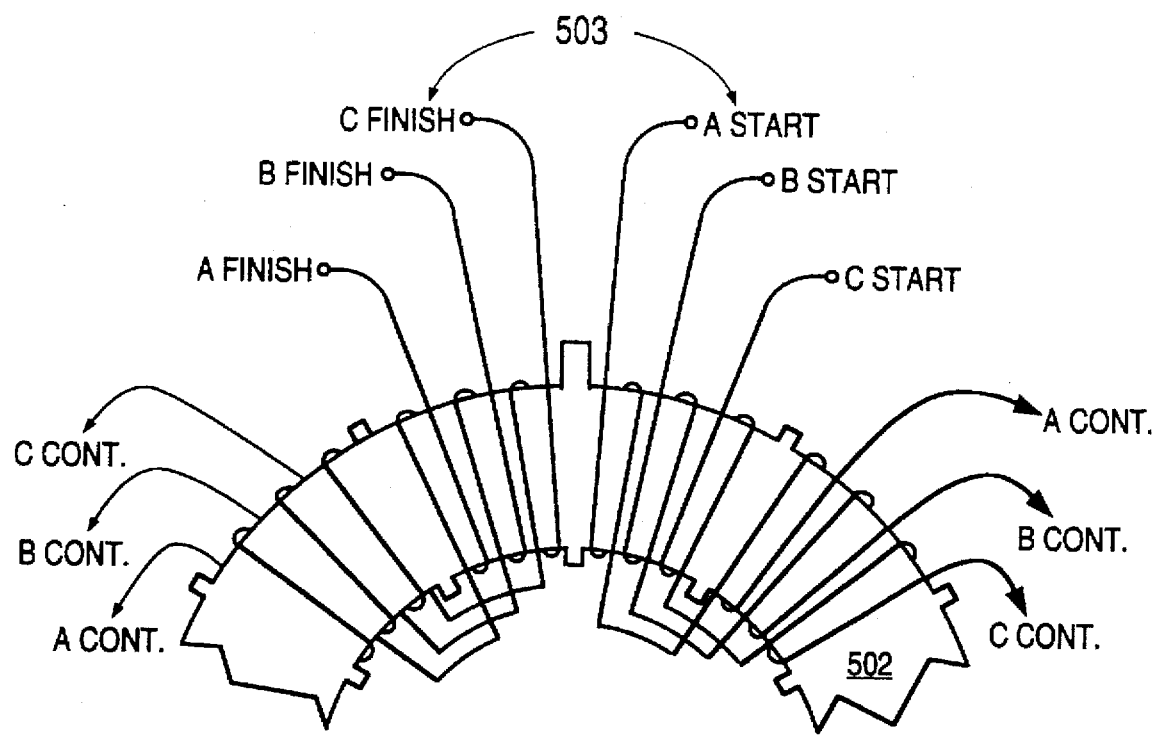
FIG. 9 illustrates a partial perspective view of exemplary windings on one stator member.

Stator member 502 receives the coil windings 503 (FIG. 5). Coil windings 503, of which only two sectors are shown in FIG. 5 for simplicity (start and finish), are wound in a radial direction, like a toroid, and provide M phases. FIG. 5 shows M equal to 3, i.e. phases A, B, and C are provided. The length between minor protrusions 505 on stator member 502 is referred to as a "sector". In other words, minor protrusions 505 on stator member 502 define a sector length and secure the coil windings 503 within that sector. The circumferential length of the combined M phases in one sector is the circumferential width of one magnetic pole. The direction of windings 503 are reversed in the adjacent sector, as shown in FIG. 9. Specifically, all phases are wound in a predetermined direction in sector 90 and in an opposite direction in sector 91. This reversal of the direction of the windings 503 corresponds to the north/south pole phases on composite magnets 506 (FIG. 5).

Main protrusions 504 on stator member 502 are located at 90° angular spacing around stator member 502. The cut-outs 504A in motor housing 510 capture main protrusions 504 of stator member 502 and, in this manner, position stator member 502 in a plane perpendicular to the axis 512 of motor shaft 501. Alternatively, main protrusions 504 are anchored into four corner struts (not shown) in motor housing 510.

Each composite magnet 506 is attached to shaft 501 and bonded to center spacer 511 with any conventional bonding agent. The square section 501A of shaft 501 mates with the square hole 506A of composite magnet 506, thereby assuring the proper alignment of these components. Moreover, square section 501A, mated to hole 506A eliminates slippage of composite magnets 506 as these magnets accelerate. Alternative conventional methods of eliminating slippage, such as "splining" the two surfaces or "keying" between the two surfaces, are used in other embodiments. Square section 501A of shaft 501 is slightly shorter than the sum of the thickness of center spacer 511 and the two composite magnets 506. The flat outer surfaces of center spacer 511, which are pressed to composite magnets 506, are ground or machined to be substantially perpendicular to axis 512 of shaft 501, thereby ensuring that composite magnets 506 rotate in a plane perpendicular to axis 512. In this manner, axial wobble of composite magnets 506 is eliminated.

Outside spacers 507, which are formed from a nonmagnetic material such as aluminum or plastic, are mounted on section 501B of shaft 501 and are typically press-fitted or pressed against and bonded to composite magnets 506. The inner surface 507A of spacer 507 is also ground flat with respect to an axis perpendicular to axis 512. Therefore, after outside spacer 507 is pressed against composite magnet 506, a near perfect plane is established in which composite magnet 506 rotates.

Figure 6:
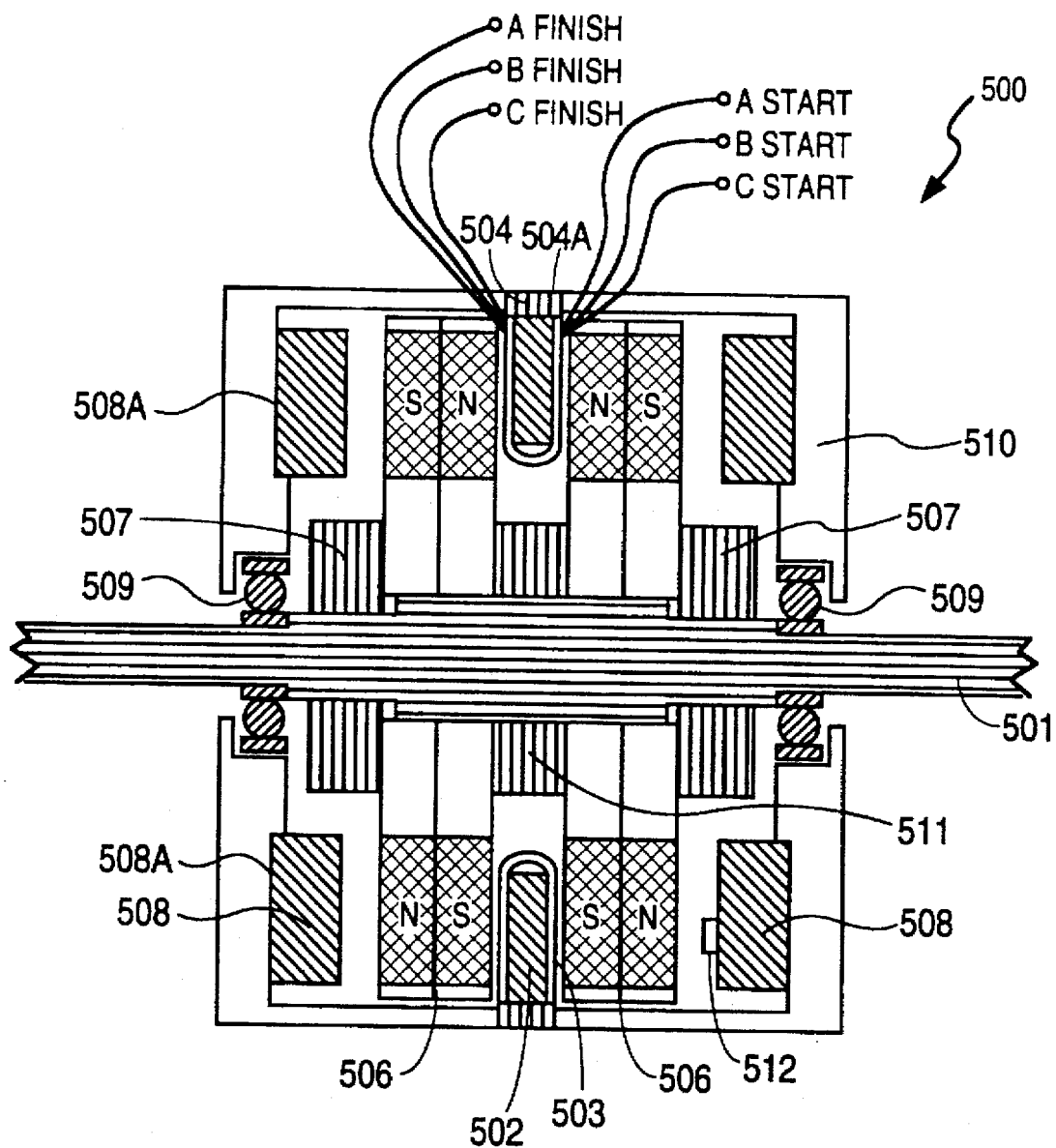
FIG. 6 shows a cross section of the assembled composite magnet DC brushless motor shown in FIG. 5.

In one embodiment of the present invention, the back iron washers 508 are mounted in recesses 508A of motor housing 510 as shown in FIG. 6. Back iron washers 508 complete the magnetic circuit on the outside of composite magnets 506. Back iron washers 508 are typically fabricated from any low carbon, i.e. high permeability, steel.

In another embodiment of the present invention, a back iron washer 508 is bonded directly onto the outside surface of each composite magnet 506. In this embodiment, back iron washer 508 becomes part of composite magnet 506, thereby adding incrementally to the moment of inertia of composite magnet 506. This increase in the moment of inertia is, however, offset by increasing the magnetic field strength, thereby increasing the available rotor torque.

Hall-effect sensors indicate the angular position of composite magnets 506 to stator member windings 503. In one embodiment, the Hall-effect sensor die is mounted onto a conventional flex circuit arc and bonded to back iron washer 508 in the air gap between back iron washer 508 and composite magnet 506. FIG. 6 illustrates Hall-effect sensor 512 in operative relation to composite magnet 506. In another embodiment, the Hall-effect sensors are mounted under coil winding 503 on stator member 502. Note that in yet other embodiments of the present invention, an optical encoder, or any encoder capable of determining the angular position of shaft 501 relative to stator member windings 503, are used in lieu of the Hall-effect sensors. Any of these embodiments automatically provides a built-in tachometer because the Hall sensors (or other encoders) are switching at a frequency proportional to the speed of composite magnet 506 (explained in detail below reference to FIGS. 18A–18F). If the Hall sensors (or other encoders) are not mounted internally to motor 500, then other devices external to motor 500 must perform the same function.

Bearings 509, shown clearly in FIG. 6, support and center rotor shaft 501, while at the same time provide a low friction interface between rotating shaft 501 and motor housing 510. Ball bearings 509 are typically standard "shielded" or "sealed" ball bearings which are lubricated for life. Motor housing 510 is the stationary outer shell of motor 500. Note that all stationary parts of motor 500, such as stator member 502, back iron washers 508, and the outer face of ball bearings 509 are mounted to motor housing 510.

Figure 7:
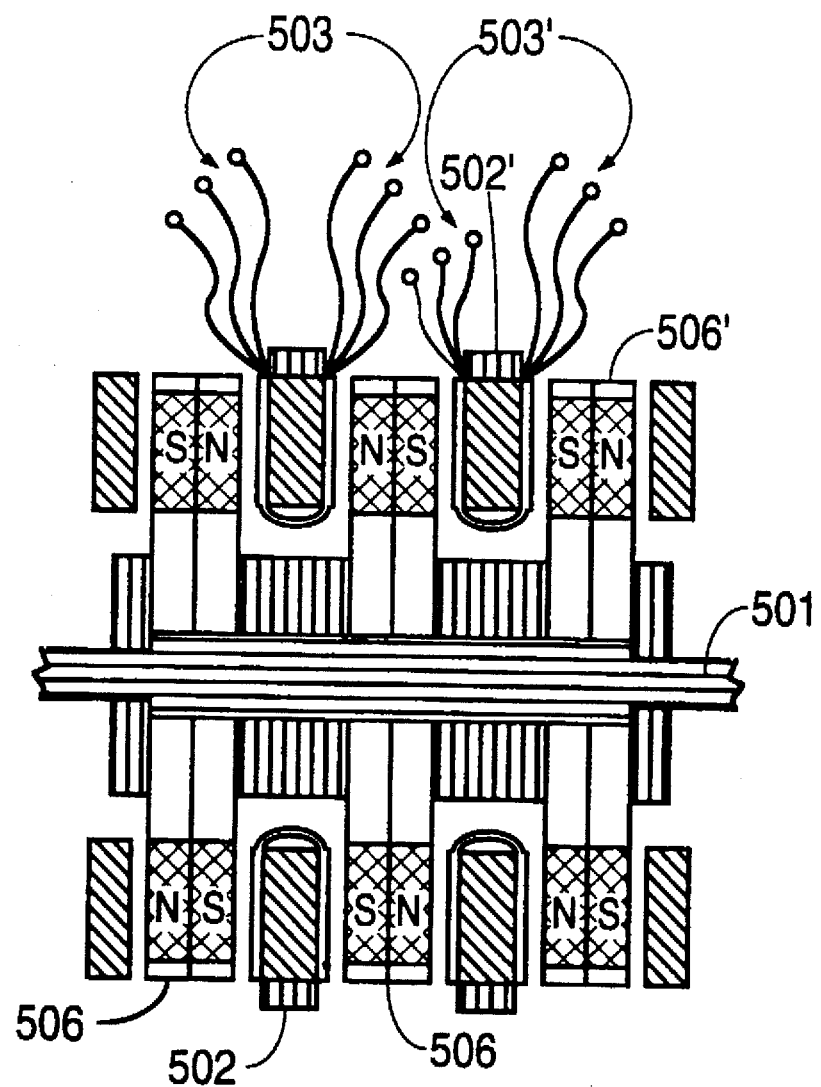
FIG. 7 illustrates a partial, cross-sectional view of another embodiment of a composite magnet brushless DC motor.

Those skilled in the art will recognize that a brushless DC motor in accordance with the present invention is modular in its construction. Specifically, and referring to FIG. 7, for every additional composite magnet 506' and stator member 502' (hereinafter the combination referred to as a "stage") which is added to shaft 501, the output power capability is multiplied by the "basic unit" power (i.e. from the motor 500 illustrated in FIG. 5) times one plus the number of stages added. For example, the addition of the stage comprising stator member 502' and composite magnet 506' shown in FIG. 7 effectively doubles the output power of motor 500 illustrated in FIG. 5. Thus, a dramatic increase of power output capability is achieved for a very small increase in volume, especially in light of the fact that motor 500 illustrated in FIG. 5 provides a significantly higher power per volume capability in comparison with a conventional type motor.

The coil windings 503' on stator member 562' are either connected in series or in parallel to coil windings 503 of stator member 503. Connecting coils 502 and 503' in series provides a higher resistance and slower running speed; while connecting coils 503 and 503' in parallel provides a lower resistance and higher speed. In other embodiments of the present invention, additional stages on shaft 501 are connected both in parallel and in series.

Figure 10:
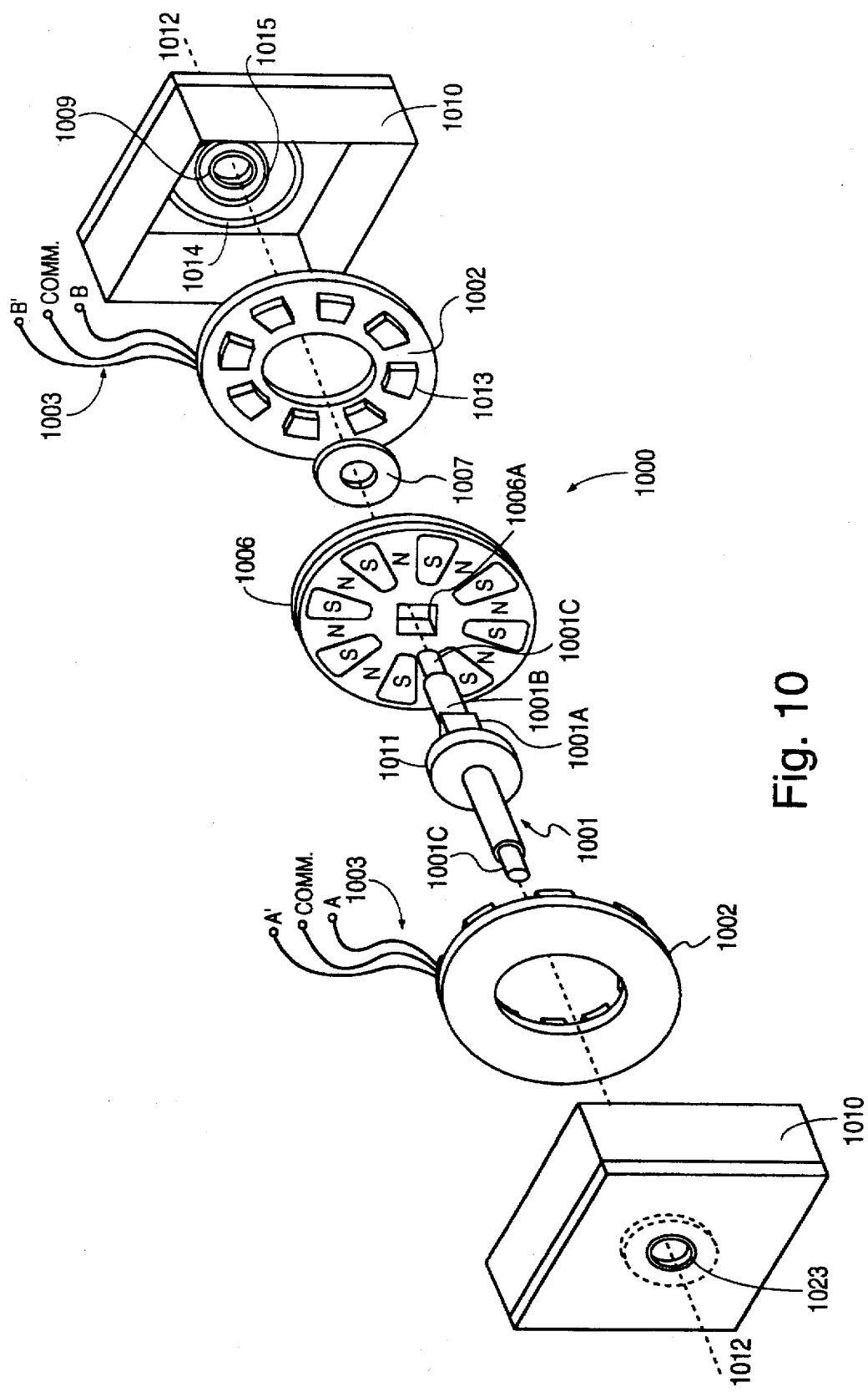
FIG. 10 illustrates an exploded perspective view of another embodiment of a composite magnet brushless DC motor in accordance with the present invention.

FIG. 10 illustrates another embodiment of a motor 1000 in accordance with the present invention which includes a composite magnet 1006. In FIG. 10, the motor shaft 1001 comprises three sections. Section 1001A supports and secures composite magnet 1006. Composite magnet 1006 includes a square hole 1006A in its center which mates identically with section 1001A (a ⅜ inch square member) of shaft 1001. Square hole 1006A in composite magnet 1006 in combination with shaft section 1001A prevent any slippage of composite magnet 1006 on shaft 1001. Other shapes for hole 1006A and shaft section 1001A, as mentioned above in reference to FIG. 6, may be used to prevent angular slippage of composite magnet 1006.

Sections 1001C of shaft 1001 are configured to be positioned in holes 1023 of motor housing 1010. Bearings 1009 (FIG. 11) provide a low friction interface between shaft 1001 which rotates and motor housing 1010 which is stationary. Sections 1001A, 1001B and 1001C of shaft 1001 are typically formed integrally, thereby providing a strong shaft for high torque conditions. Motor housing 1010 secures stator members 1002 by annular indentations 1014. Annular indentation 1015, also formed in housing 1010, holds bearings 1009.

Spacer 1011, which is press-fitted onto shaft 1001, provides a flat surface against one face of composite magnet 1006. Spacer 1007, also press-fitted on shaft section 1001B, provides a flat surface against the other face of composite magnet 1006. Thus, composite magnet 1006 is sandwiched between spacers 1011 and 1007. Because spacers 1011 and 1007 form planes perpendicular to shaft 1001, spacers 1011 and 1007 eliminate any axial wobble of composite magnet 1006 that might otherwise occur. Both spacer 1011 and 1007 are formed from non-magnetic material, as is shaft 1001.

Figure 11:
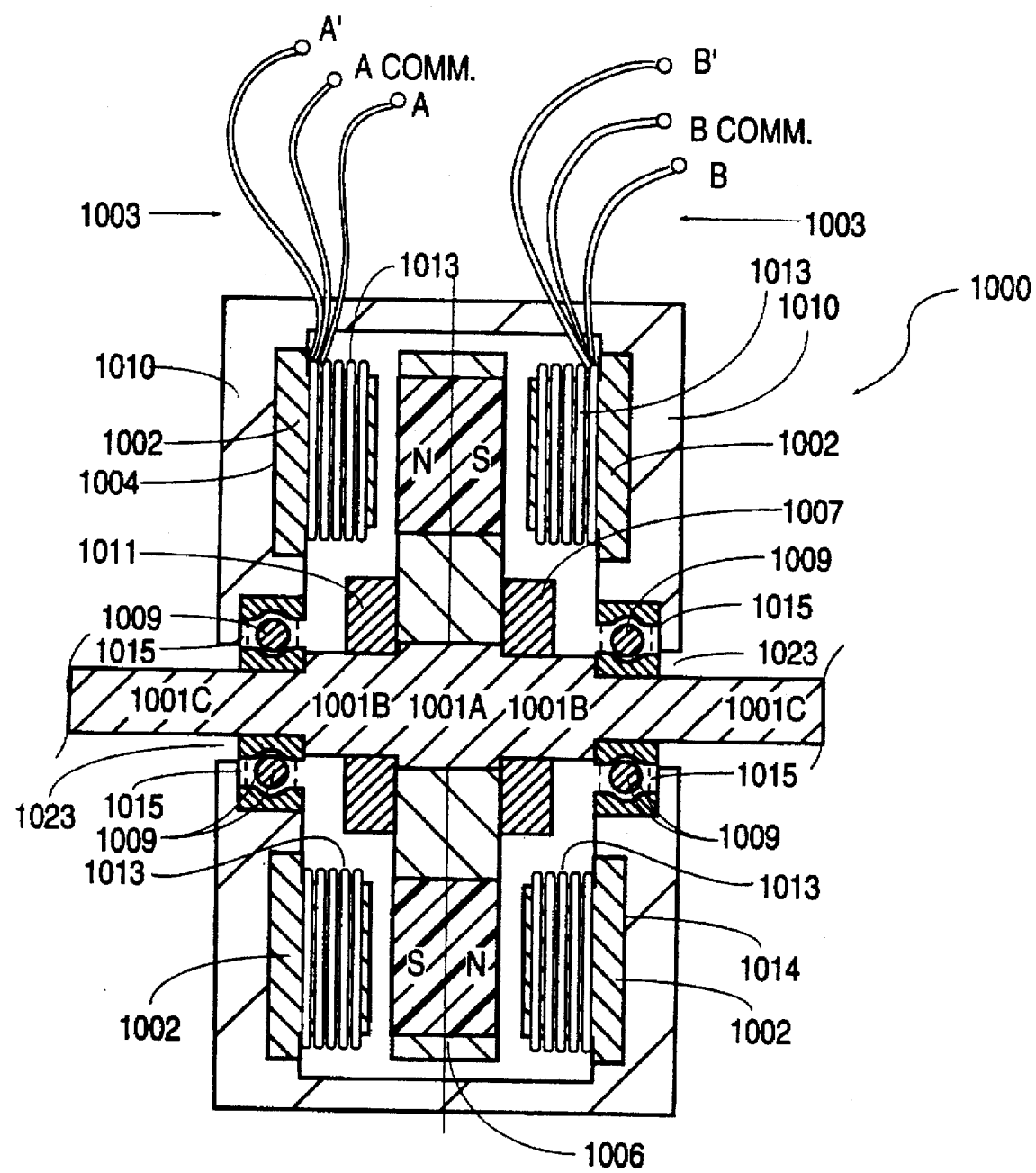
FIG. 11 shows a cross-sectional view of the assembled brushless DC motor shown in FIG. 10.

Note that the number of members shown in FIGS. 10 and 11 is significantly reduced from that in the prior art (see, for example, Oney). Therefore, the cost of manufacture of a brushless DC motor in accordance with the present invention is lower than in the prior art. Additionally, these members are easily tooled and assembled, thereby further reducing the cost to manufacture a brushless DC motor.

Furthermore, as mentioned previously in reference to the area of energy conversion per unit volume, the power provided by the composite magnet in the brushless DC motor is typically greater than the power provided by prior art brushless DC motors of equal size. Therefore, the cost per unit power is also less in accordance with the present invention in comparison to conventional brushless DC motors.

Figure 12A:
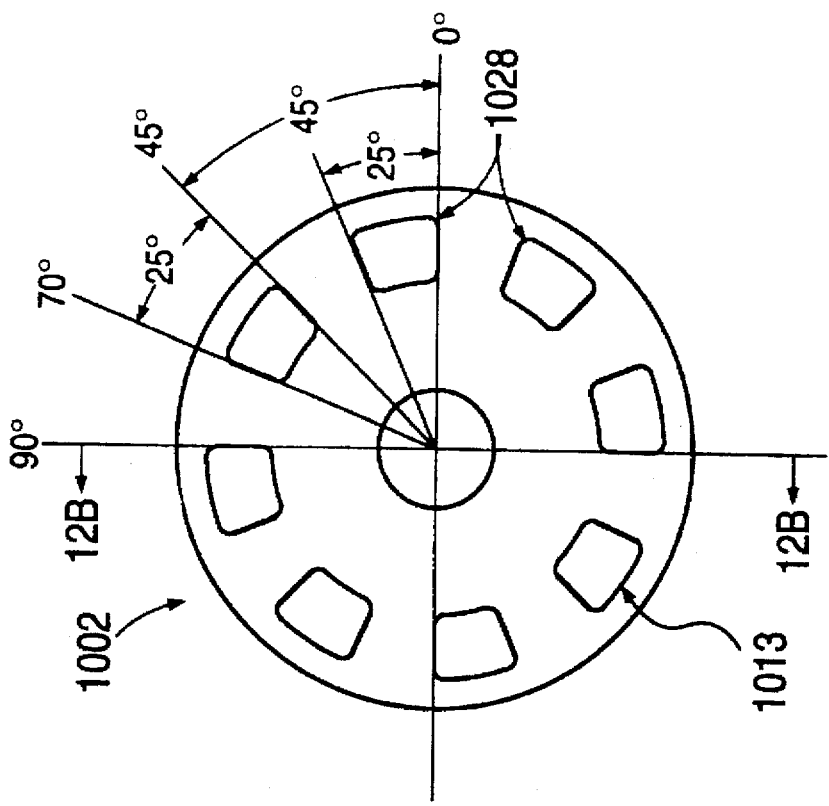
FIGS. 12A and 12B illustrate a top and cross-sectional view, respectively, of another stator plate in accordance with the present invention.
Figure 12B:
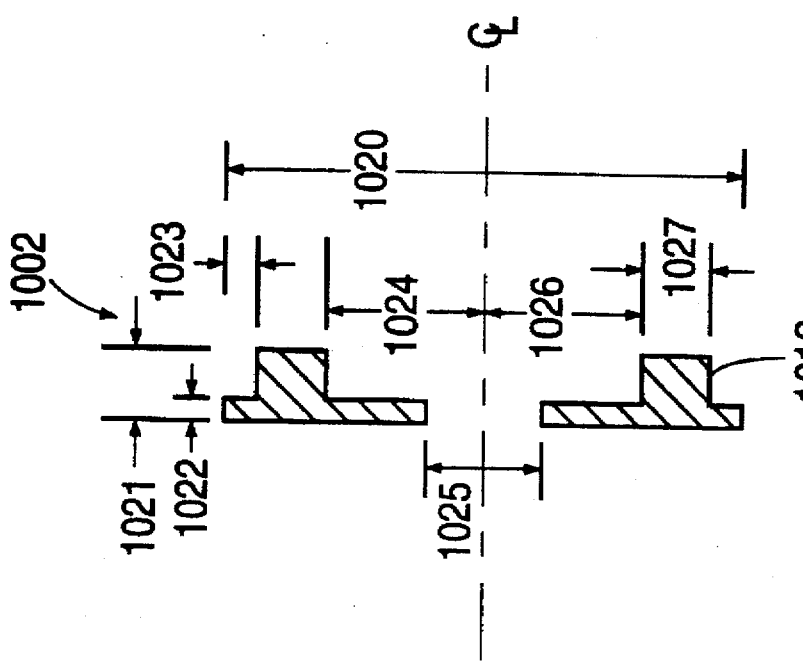

FIG. 11 illustrates the brushless DC motor 1000 of FIG. 10 in cross-section. Pole pieces 1013 are formed on stator member 1002. Coil windings 1003, wound around pole pieces 1013, form electro-magnetic poles which, depending upon the current flow through coil windings 1003 (described in detail below), create an apparent north or south pole at any given pole piece surface adjacent to composite magnet 1006. FIGS. 12A and 12B illustrate a top view and cross-sectional view, respectively, of one embodiment of stator member 1002 having eight pole pieces 1013. The dimensions for stator member 1002 are as follows, 1020: 2.4 inches (6.906 cm), 1021: 0.33 inches (0.838 cm), 1022: 0.1 inches (0.254 cm), 1023: 0.15 inches (0.381 cm), 1024: 0.75 inches (1.905 cm), 1025: 0.6 inches (1.524 cm), 1026: 0.75 inches (1.905 cm), 1027: 0.3 inches (0.762 cm), and corner radius 1028: 0.125 inches (0.3175 cm). In this embodiment, stator member 1002 is die cast from Keystone Z29 powdered metal.

Referring back to FIGS. 10 and 11, each stator member 1002 has two phases (i.e. phases A and A' or phases B and B') formed by coil windings 1003 on pole pieces 1013. FIG. 13A shows an unwrapped linear view of illustrative phase A and phase A' windings on stator member 1002. Eight pole pieces 91–98 are shown. As shown in FIG. 13A, the start of phase A on pole piece 91 is connected to voltage source $V_B$ (typically 12 volts). The finish of phase A on pole piece 91 is connected to the finish of phase A on pole piece 92. The start of phase A on pole piece 92 is connected to the start on pole piece 93. In this manner, as current flows through phase A, opposite polarities are provided on adjacent pole pieces. Phase A' is wound opposite to phase A on pole pieces 91–98. FIG. 13B illustrates that because the coils for phases A and A' on each pole piece are wound in opposite directions the currents flowing through these coils oppose each other. This difference in current flow produces opposite polarities in the pole pieces. Thus, if pole piece 96 exhibits a south face as current flows through the phase A winding, pole piece 96 exhibits a north face if current flows through the phase A' winding.

In one embodiment, phases A, A', B, and B' are constructed from 24 AWG wire having a diameter (with insulation) of 0.022 inches (0.0559 cm), and a resistance of approximately 0.026 Ohms/foot (0.00085 Ohms/cm). The length of wire for one complete turn around a pole piece is approximately 1.65 inches (4.191 cm). The number of turns for one pole piece is, for example, 11. Thus, the length of wire required for one pole piece (i.e. a coil) is about 18 inches (45.72 cm). In this embodiment of the present invention, 8 pole pieces must be wound for each phase. Therefore, each phase has a wire length of 145 inches (368.3 cm), which provides a resistance of 0.315 Ohms (0.026 Ohms/ft×1 foot/12 inches×145 inches).

Figure 14:
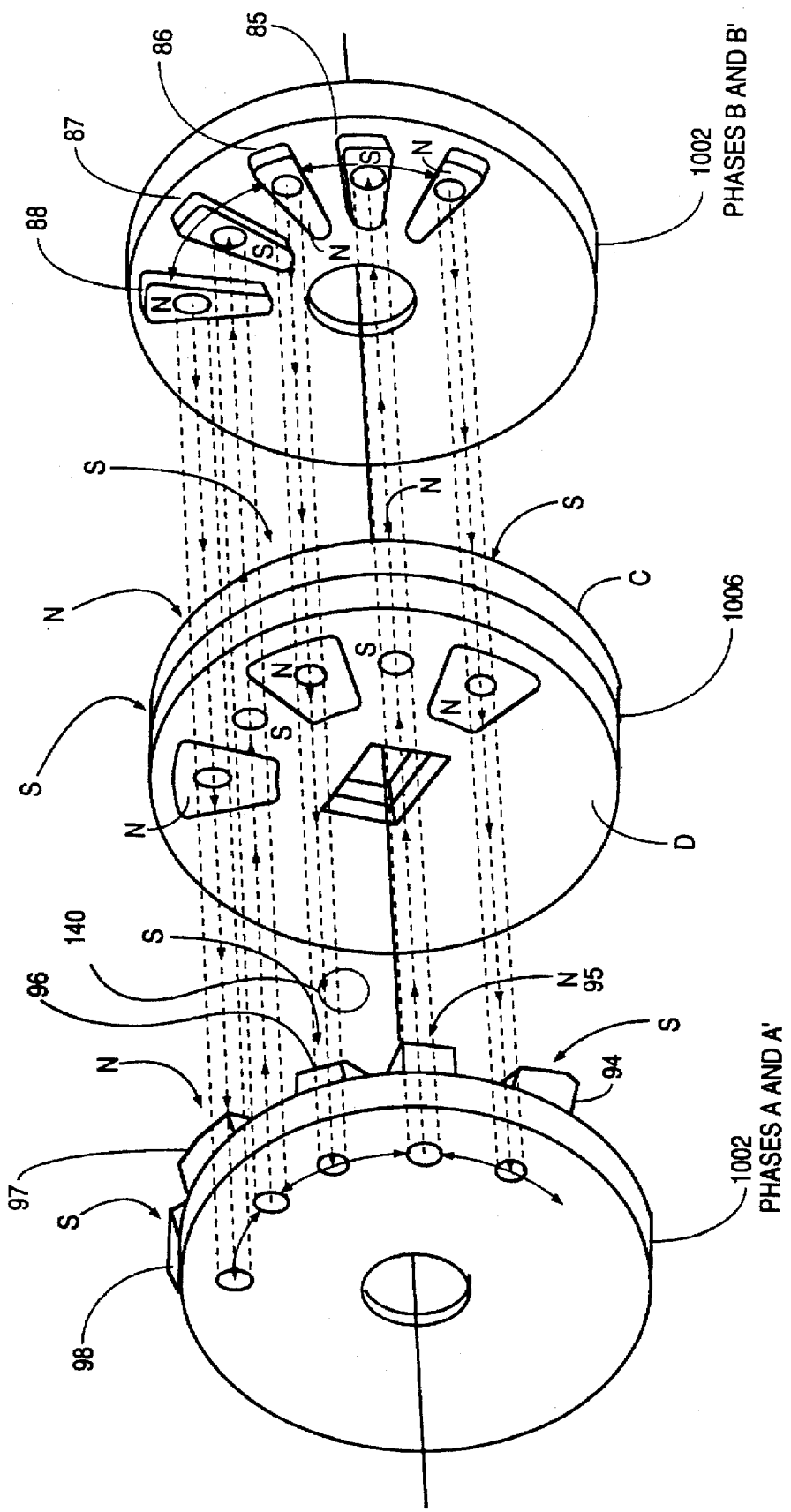
FIG. 14 illustrates an exploded perspective view of the composite magnet and two stator members with four flux loops shown schematically.
Figure 15:
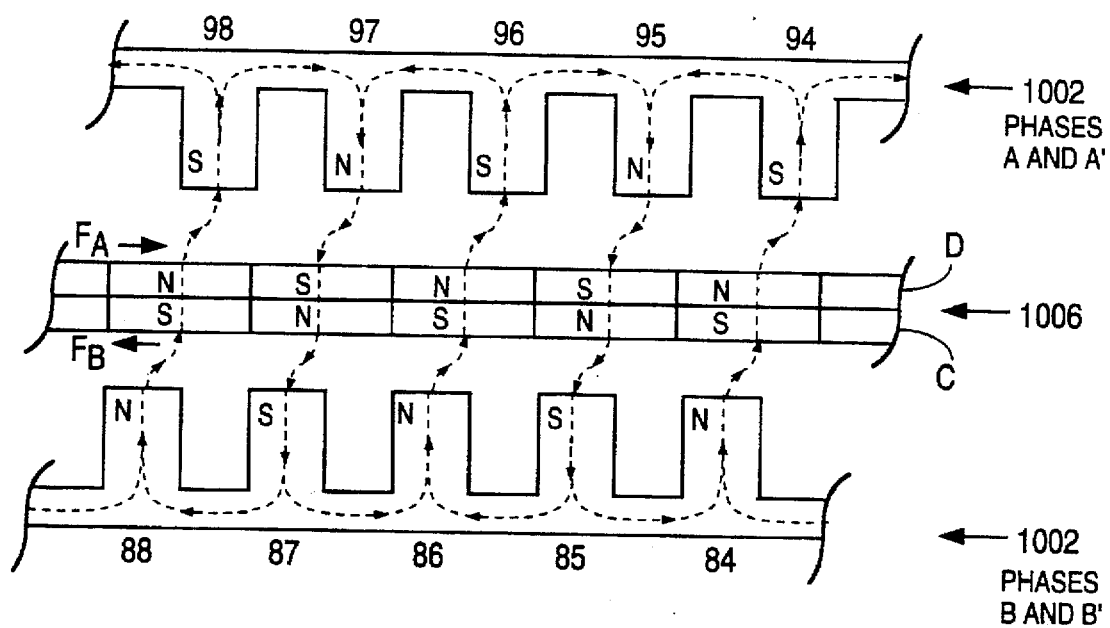
FIG. 15 illustrates schematically a linear section of the composite magnet, two stator members, and a flux path between these members.

FIG. 14 shows composite magnet 1006 and stator members 1002 with four flux loops illustrated schematically. FIG. 15 illustrates a linear section of these same components to further clarify the flux path. Referring to the flux path 140 in FIG. 14, the magnetic flux pattern is established from north to south poles. For example, the flux path 140 begins at pole piece 86 which exhibits a north face, travels through the south pole on side C and the north pole on side D of composite magnet 1006. Thus, when a flux path is established between all pole pieces through composite magnet 1006, a "cylinder" of parallel magnet circuits is formed. The path continues to pole piece 96 on stator member 1002 which exhibits a south face. At this point, as seen more clearly in FIG. 15, the path diverges. One half of the flux travels to adjacent pole piece 95 and the other half of the flux travels to pole piece 97, both pole pieces exhibiting north poles. Thus, a flux path in the stator members is in a perpetual state of being halved or doubled.

Figure 16A:
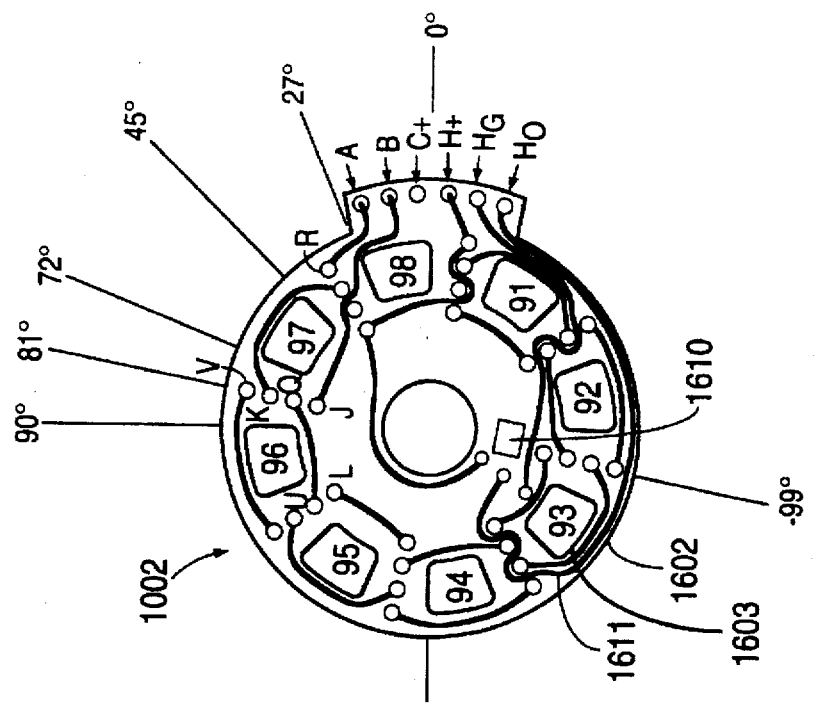
FIGS. 16A and 16B show a top and a cross-sectional view, respectively, of a PC board assembly for interconnection of coils.
Figure 16C:
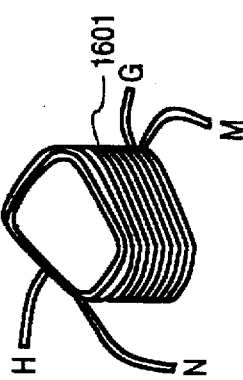
FIG. 16C illustrates a pole piece coil in accordance with one embodiment of the present invention.
Figure 16B:
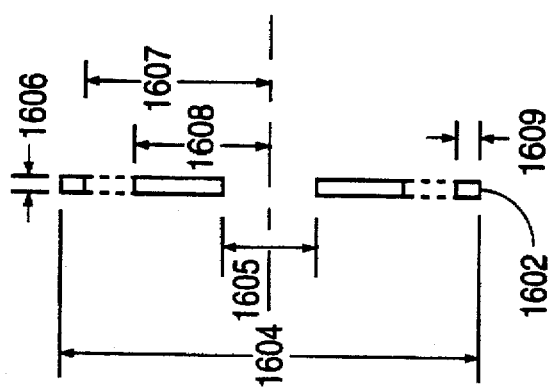

In another embodiment of the present invention, the interconnection of individual coils on stator member 1002 (FIGS. 13A and 13B) are formed using standard PC board assembly processes. Referring to FIGS. 16A, 16B, and 16C, a pole piece coil 1601 is pre-wound to conform to any pole piece 1013 (FIG. 11). Coil 1601 is then bonded, i.e. exposed to a current which heats coil 1601 above the thermal limits of its outer insulation, thereby causing coil 1601 to form a solid component. Coil 1601 is then adhesively connected to PC board 1602 surrounding each hole 1603. PC board 1602 comprises standard PC board material, typically epoxy glass, which is 0.03 inches (0.076 cm) thick (reference numeral 1606) as shown in FIG. 16B. The other dimensions for PC board 1602 are as follows, 1604: 2.45 inches (6.223 cm), 1605: 0.85 inches (2.159 cm), 1606: 0.03 inches (0.076 cm), 1607: 1.06 inches (2.692 cm), 1608: 0.74 inches (1.880 cm), and 1609: 0.165 inches (0.419 cm). Each corner of hole 1603 in this embodiment has an internal radius of 0.0625 inches (0.159 cm). Hole 1610 has the dimension of 0.18 inches square (0.0279 cm²). Copper traces, typically 0.062 inches (0.1575 cm.) wide, are formed on PC board 1602 to provide interconnections between coils 1601. Hall sensor traces 1611, typically a minimum of 0.01 inches (0.0254 cm) wide, are also formed in PC board 1602 for connecting the Hall sensor (not shown) to lead wires A, B, and C having a 0.03 inch (0.076 cm) maximum diameter and wires $H_+$, $H_G$, and $H_O$ having a 0.01 inches (0.025 cm) maximum diameter. For example, coil 1601 has ends M and N which are connected to trace ends R and Q, respectively and ends G and H which are connected to trace ends I and J. Connection is done typically by wave soldering. Similarly, another coil 1601 has ends M and N connected to trace ends V and U and ends G and H connected to trace ends K and L. This connection achieves the electrical configuration shown in FIGS. 13A and 13B. After all coils 1601 are bonded to the traces by wave soldering, PC board 1602 is connected to stator member 1002. This connection is commonly done with adhesive. In this manner, manufacturing and assembly costs for stator members 1002 are significantly reduced.

Figure 17A:
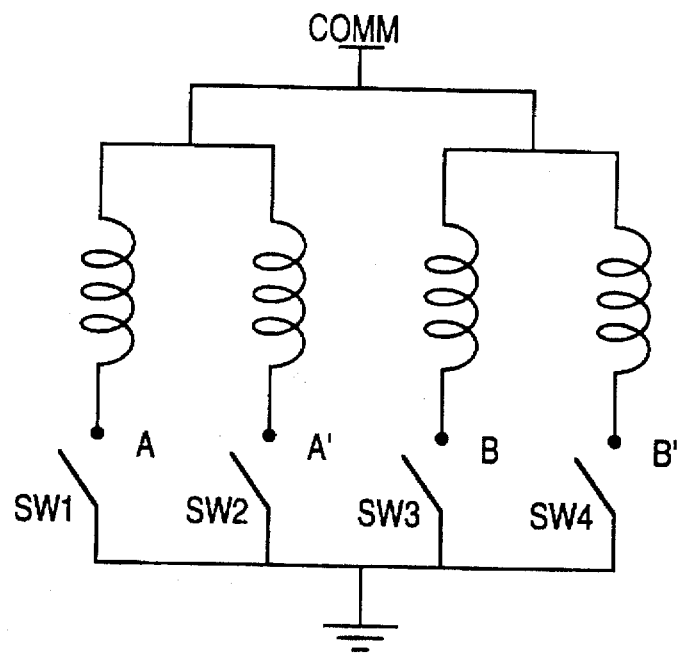
FIGS. 17A and 17B show a typical unipolar drive connection and a two-phase bipolar drive connection, respectively.

A typical unipolar drive connection to accomplish this reversal of polarities is illustrated in FIG. 17A. In FIG. 17A, four switches, SW1, SW2, SW3, and SW4 are selectively coupled to phases A, A', B, and B', respectively. Each phase has a start S or finish F connected to common node COMM. Common node COMM is coupled to a voltage source VCC which typically may be 5, 12, or 24 volts. Each switch is connected to ground. Closing a switch provides a current through the phase associated with that switch. For example, if switches SW2 and SW3 are closed, current is provided to phases A' and B.

Figure 17B:
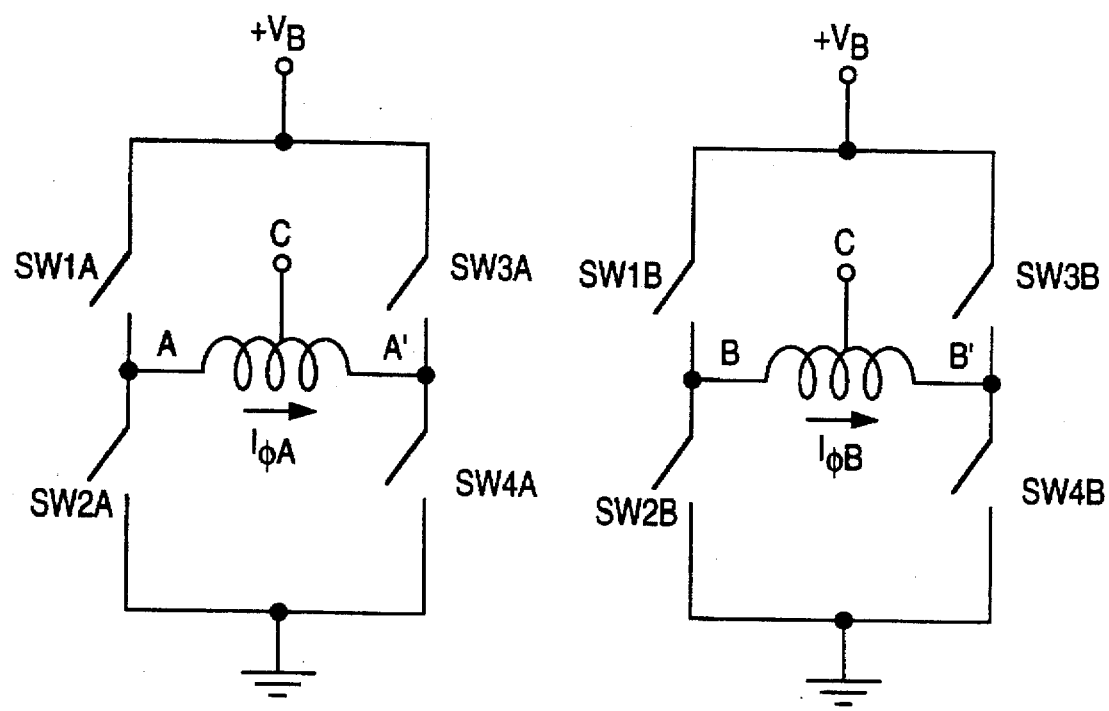

FIG. 17B illustrates a two-phase bipolar drive connection. This configuration doubles the number of switches shown in FIG. 17A. The switching sequence for the two phase bipolar drive connection illustrated in FIG. 17B is listed in Table 1 below.

TABLE 1

| θ magnetic | SW1A | SW2A | SW3A | SW4A | SW1B | SW2B | SW3B | SW4B | $I_{\theta A}$ | $I_{\theta B}$ |
| --- | --- | --- | --- | --- | --- | --- | --- | --- | --- | --- |
| 0–90° | ON | | | ON | ON | | | ON | + | + |
| 90°–180° | | ON | ON | | ON | | | ON | − | + |
| 180°–270° | | ON | ON | | | ON | ON | | − | − |
| 270°–360° | ON | | | ON | | ON | ON | | + | − |

Referring to Table 1, between an arbitrary angular rotation of the composite magnet (not shown), of 0°–90°, switches SW1A, SW4A, SW1B, and SW4B are switched on, thereby providing a positive current in both phases A and B. During the next rotation of the composite magnet between 90 and 180 magnetic degrees, switches SW2A, SW3A, SW1B, and SW4B are switched on, thereby providing a negative current through phase A and a positive current through phase B. All switches described above for FIGS. 17A and 17B are activated by decoded output signals from the Hall sensors which will be described in further detail below. Typically, switches as shown in FIGS. 17A or 17B include either NPN transistors or N-channel power MOSFET's.

Figure 18A:
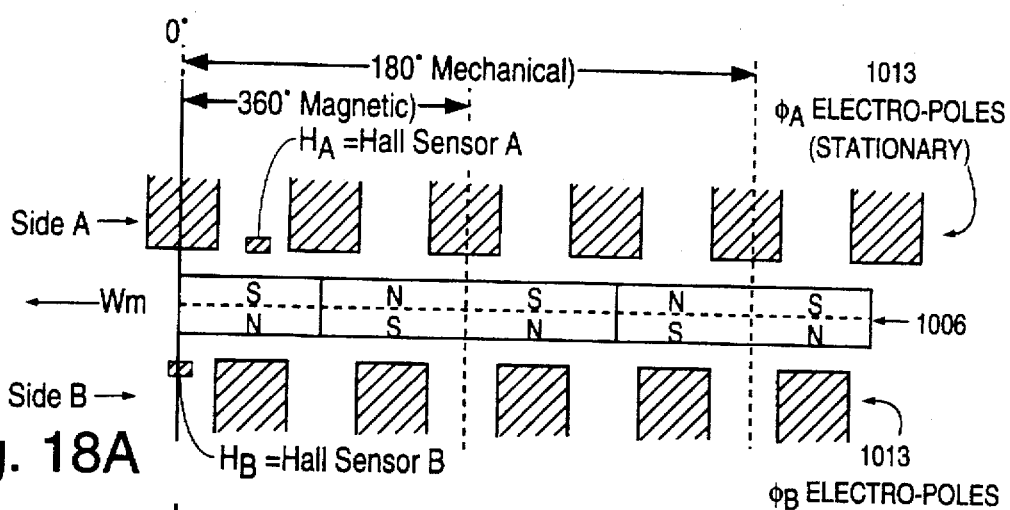
FIG. 18A illustrates the positioning of the Hall sensors to the composite magnet and the stator members.
Figure 18B:
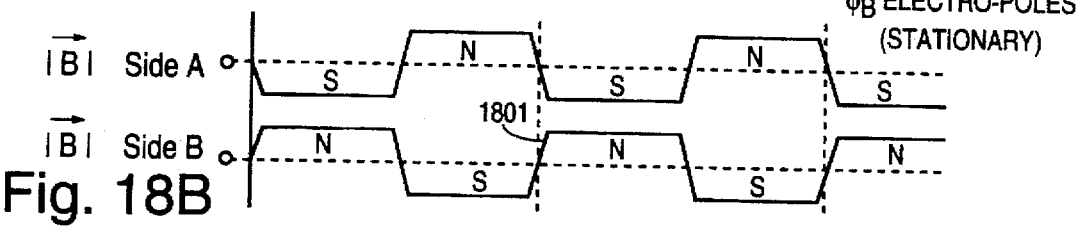
FIG. 18B shows the magnetic fields associated with the composite magnet.

FIG. 18A illustrates a partial linear view of composite magnet 1006, pole pieces 1013 on stator members 1002 (not shown), and Hall sensors $H_A$ and $H_B$. Hall sensors $H_A$ and $H_B$ provide output signals which, after decoding, control the generation of magnetic poles on stator members 1002. As shown in FIG. 18A, Hall sensor $H_A$ is positioned at 90° (magnetic) from Hall sensor $H_B$. Hall sensors $H_A$ and $H_B$ are triggered to provide a particular pole configuration by an opposite magnetic pole on composite magnet 1006 (recall that composite magnet 1006 is rotating in a closed loop system). Thus, each stator member 1002 provides a particular pole configuration for 180° (magnetic), i.e. while a Hall sensor continues to sense the polarity of a particular magnetic pole of composite magnet 1006. Because Hall sensors $H_A$ and $H_B$ are positioned at 90° (magnetic) from each other, one stator member is changing its polarity every 90° (magnetic). FIG. 18B illustrates the field $\vec{B}$ emanating from each side of composite magnet 1006.

Figure 18C:
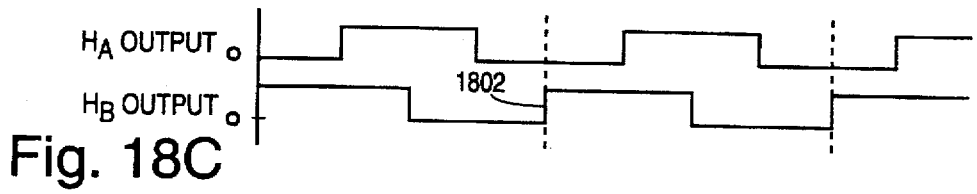
FIG. 18C illustrates the output signals from the Hall sensors as the composite magnet travels at an angular velocity $\omega_m$.
Figure 18D:
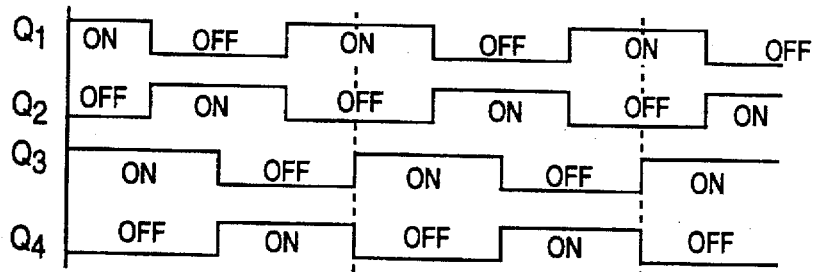
FIG. 18D illustrates the decoded output signals from the Hall sensors.

FIG. 18C shows the output signals from Hall sensors $H_A$ and $H_B$ as composite magnet 1006 rotates. As shown in FIG. 18C, a north pole 1801 (see FIG. 18B) triggers either Hall sensor $H_A$ or $H_B$ to turn on, i.e. output a high signal 1802. FIGS. 18C-18F illustrate various outputs, described in detail below, as composite magnet 1006 rotates at a predetermined angular velocity $\omega_m$. For example, as shown in FIG. 18C, Hall sensor $H_A$ outputs a low signal at zero magnetic degrees for 90 magnetic degrees until Hall sensor $H_A$ is activated by the north face of composite magnet 1006 (because composite magnet 1006 has rotated 90 magnetic degrees). The output signals from Hall sensors $H_A$ and $H_B$ are then decoded to provide four distinct output signals $Q_1$, $Q_2$, $Q_3$, and $Q_4$ as shown in FIG. 18D. Referring to both FIGS. 18C and 18D, Hall sensor $H_A$ provides signals $Q_1$ and $Q_2$, while Hall sensor $H_B$ provides signals $Q_3$ and $Q_4$. These output signals, i.e. low or high signals depending upon the position of composite magnet 1006 determine the open or closed state of the switches described in reference to FIGS. 17A and 17B.

Figure 18E:
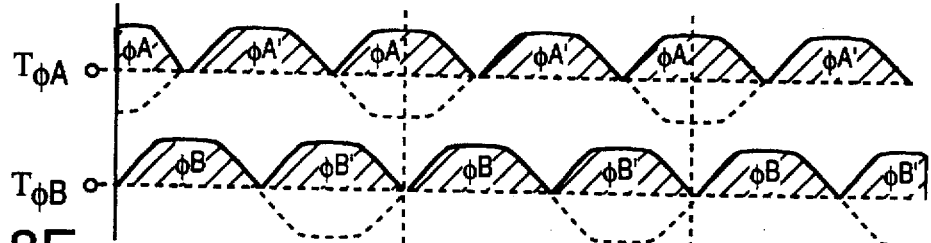
FIG. 18E shows the torque generated by phases A/A' and B/B'.
Figure 18F:
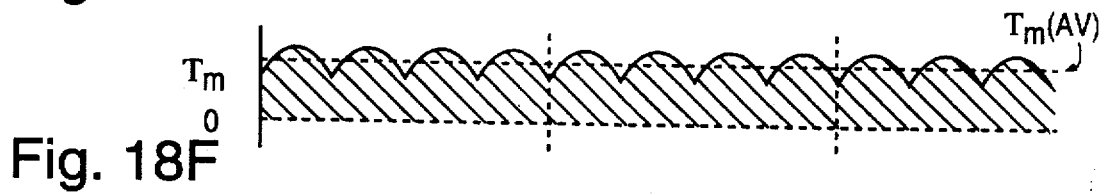
FIG. 18F illustrates the average motor torque in accordance with the present invention as the composite magnet rotates.

FIG. 18E illustrates the torque $T_{\phi A}$ from phases A and A' as well as the torque $T_{\phi B}$ from phases B and B' as composite magnet 1006 rotates. FIG. 18F shows the average motor torque $$T_{m(av)} \left( \text{equal to } T_0 \left( 1 + \frac{2}{\pi} \right) \right)$$

for a brushless DC motor in accordance with the present invention. Note that the total motor torque $T_m$ is approximately equal to $\Sigma\, T_{\phi A} + T_{\phi B}$.

While the invention has been described with respect to certain embodiments, the scope of the present invention is defined by the appended claims and is not necessarily limited to the embodiments described herein, which are merely illustrative. For example, the number of composite magnets and stator members may vary depending on the application. Moreover, any number of phases may be present on an individual stator member. Furthermore, dimensions for all components are illustrative only and vary depending on the application. Accordingly, other embodiments and variations not described herein may be within the scope of the invention, as defined by the appended claims.

I claim:

1. A multi-pole composite magnet comprising:

a first section having a first hub having a first axis about which said first hub is capable of rotating, said first hub having a first plurality of members integrally formed with said first hub and radially extending away from said first axis in a plane perpendicular to said first axis; and a second section having a second hub having a second axis about which said second hub is capable of rotating, said second axis coinciding with said first axis, said second hub having a second plurality of members integrally formed with said second hub and radially extending away from said second axis in a plane perpendicular to said second axis, wherein said first and second plurality of members are permanently magnetized in opposite directions parallel to either said first or second axis, wherein said first and second sections are rigidly mated together, and wherein each member of said first plurality of members is located between a pair of members of said second plurality of members and wherein each member of said second plurality of members is located between a pair of members of said first plurality of members.

* * * * *